US011935470B2

(12) United States Patent
Wang et al.

(10) Patent No.: US 11,935,470 B2
(45) Date of Patent: Mar. 19, 2024

(54) PIXEL CIRCUIT AND DRIVING METHOD THEREOF, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Rui Wang, Beijing (CN); Ming Hu, Beijing (CN); Haijun Qiu, Beijing (CN); Weiyun Huang, Beijing (CN); Yao Huang, Beijing (CN); Chao Zeng, Beijing (CN); Yuanyou Qiu, Beijing (CN); Shaoru Li, Beijing (CN); Tianyi Cheng, Beijing (CN)

(73) Assignees: CHENGDU BOE OPTOELECTRONICS TECHNOLOGY CO., LTD., Sichuan (CN); BOE TECHNOLOGY GROUP C0., LTD., Beijing (CN)

( * ) Notice: Subject to any disclaimer, the term of this patent is extended or adjusted under 35 U.S.C. 154(b) by 0 days.

(21) Appl. No.: 17/639,599

(22) PCT Filed: Apr. 30, 2021

(86) PCT No.: PCT/CN2021/091234
§ 371 (c)(1),
(2) Date: Mar. 2, 2022

(87) PCT Pub. No.: WO2022/226951
PCT Pub. Date: Nov. 3, 2022

(65) Prior Publication Data

US 2023/0031984 A1 Feb. 2, 2023

(51) Int. Cl.
*G09G 3/32* (2016.01)
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ......... G09G 3/3233; G09G 2300/0426; G09G 2300/0819; G09G 2300/0842; G09G 2310/08
See application file for complete search history.

(56) References Cited

U.S. PATENT DOCUMENTS 10,373,557 B2 8/2019 Zhu et al.
10,991,300 B2 4/2021 Kim et al.
(Continued)

FOREIGN PATENT DOCUMENTS

CN 106558287 A 4/2017
CN 109949743 A 6/2019
(Continued)

OTHER PUBLICATIONS

First Office Action of the corresponding CN202180000989.4 and search report.

*Primary Examiner* — Roy P Rabindranath

(57) ABSTRACT

A pixel circuit and a driving method thereof, and a display device are provided. The pixel circuit includes a driving sub-circuit, a data writing sub-circuit, a first light-emitting control sub-circuit, a second light-emitting control sub-circuit, a compensation sub-circuit, and a first reset sub-circuit, and is configured to generate a driving current to control a light-emitting element to emit light, the first reset sub-circuit comprises a first transistor, the compensation sub-circuit comprises a second transistor, the first transistor and the second transistor are both polysilicon oxide thin film transistors, and an active layer type of the first transistor and an active layer type of the second transistor are different from an active layer type of a transistor comprised in at least
(Continued)

one selected from a group consisting of the driving sub-circuit, the data writing sub-circuit, the first light-emitting control sub-circuit, and the second light-emitting control sub-circuit.

19 Claims, 7 Drawing Sheets

(52) U.S. Cl.
CPC . *G09G 2300/0842* (2013.01); *G09G 2310/08* (2013.01); *G09G 2320/0233* (2013.01); *G09G 2320/0247* (2013.01)

(56) References Cited

U.S. PATENT DOCUMENTS

| | | | | |
|---|---|---|---|---|
| 11,114,003 | B2 | 9/2021 | Zheng | |
| 11,308,852 | B2 | 4/2022 | Xiong et al. | |
| 11,373,582 | B2 | 6/2022 | Lee et al. | |
| 11,373,590 | B2 | 6/2022 | Yuan et al. | |
| 11,410,609 | B2 | 8/2022 | Zhang et al. | |
| 2019/0073955 | A1 | 3/2019 | Zou et al. | |
| 2019/0095016 | A1* | 3/2019 | Yang | G06F 3/0443 |
| 2019/0325826 | A1 | 10/2019 | Yang et al. | |
| 2021/0390906 | A1* | 12/2021 | Pyun | G09G 3/3266 |
| 2022/0044635 | A1* | 2/2022 | Roh | G09G 3/3258 |
| 2022/0122522 | A1 | 4/2022 | Li et al. | |
| 2023/0035664 | A1* | 2/2023 | An | G09G 3/3233 |

FOREIGN PATENT DOCUMENTS

| | | | |
|---|---|---|---|
| CN | 110047431 | A | 7/2019 |
| CN | 110176213 | A | 8/2019 |
| CN | 110223640 | A | 9/2019 |
| CN | 110600509 | A | 12/2019 |
| CN | 111128080 | A | 5/2020 |
| CN | 111477178 | A | 7/2020 |
| CN | 111508426 | A | 8/2020 |
| CN | 111583866 | A | 8/2020 |
| CN | 111653242 | A | 9/2020 |
| CN | 111968574 | A | 11/2020 |
| CN | 112133253 | A | 12/2020 |
| CN | 112150964 | A | 12/2020 |
| CN | 112150967 | A | 12/2020 |
| CN | 112233616 | A | 1/2021 |
| CN | 112700749 | A | 4/2021 |

* cited by examiner

PIXEL CIRCUIT AND DRIVING METHOD THEREOF, AND DISPLAY DEVICE

TECHNICAL FIELD

At least one embodiments of the present disclosure relates to a pixel circuit and a driving method thereof, and a display device.

BACKGROUND

An organic light emitting diode (OLED) is an active light emitting display device, has the advantages of self-illumination, wide viewing angle, high contrast, low power consumption, extremely high response speed, and so on, and has been widely used in display products such as a mobile phone, a tablet computer, and a digital camera. The OLED display belongs to a current drive, a current needs to be output to the OLED through a pixel circuit to drive the OLED to emit light.

SUMMARY

At least one embodiment of the present disclosure provides a pixel circuit, comprising a driving sub-circuit, a data writing sub-circuit, a first light-emitting control sub-circuit, a second light-emitting control sub-circuit, a compensation sub-circuit, and a first reset sub-circuit, and the pixel circuit is configured to generate a driving current to control a light-emitting element to emit light, the driving sub-circuit comprises a control terminal, a first terminal, and a second terminal; the data writing sub-circuit is electrically connected to the first terminal of the driving sub-circuit and a data signal terminal, and is configured to write a data signal of the data signal terminal into the first terminal of the driving sub-circuit in response to a signal of a first scan signal terminal; the compensation sub-circuit is electrically connected to the second terminal of the driving sub-circuit and the control terminal of the driving sub-circuit, and is configured to perform threshold compensation on the driving sub-circuit in response to a signal of a compensation control signal terminal; the first light-emitting control sub-circuit is electrically connected to the first terminal of the driving sub-circuit and a first voltage terminal, and is configured to achieve a connection between the driving sub-circuit and the first voltage terminal to be turned on or off in response to a signal of a light-emitting signal control terminal; the second light-emitting control sub-circuit is electrically connected to the second terminal of the driving sub-circuit and a first electrode of the light-emitting element, and is configured to achieve a connection between the driving sub-circuit and the light-emitting element to be turned on or off in response to the signal of the light-emitting signal control terminal; and the first reset sub-circuit is electrically connected to the second terminal of the driving sub-circuit and a second voltage terminal, and is configured to write a signal of the second voltage terminal into the second terminal of the driving sub-circuit in response to a signal of a second scan signal terminal; the first reset sub-circuit comprises a first transistor, the compensation sub-circuit comprises a second transistor, the first transistor and the second transistor are both polysilicon oxide thin film transistors, and an active layer type of the first transistor and an active layer type of the second transistor are different from an active layer type of a transistor comprised in at least one selected from a group consisting of the driving sub-circuit, the data writing sub-circuit, the first light-emitting control sub-circuit, and the second light-emitting control sub-circuit.

For example, the pixel circuit provided by at least one embodiment of the present disclosure further includes a second reset sub-circuit, the second reset sub-circuit is electrically connected to the first electrode of the light-emitting element and a third voltage terminal, and is configured to write a signal of the third voltage terminal into the first electrode of the light-emitting element in response to a signal of a reset control signal terminal to reset the first electrode of the light-emitting element.

For example, in the pixel circuit provided by at least one embodiment of the present disclosure, the first scan signal terminal and the reset control signal terminal are connected to an identical signal line.

For example, in the pixel circuit provided by at least one embodiment of the present disclosure, the data writing sub-circuit comprises a third transistor, in a case where the pixel circuit is in a first display mode, a turn-on frequency of the third transistor is greater than a turn-on frequency of the second transistor, and in a case where the third transistor and the second transistor are both turned on, the data signal is transmitted to the control terminal of the driving sub-circuit.

For example, in the pixel circuit provided by at least one embodiment of the present disclosure, a voltage value of the signal of the third voltage terminal is greater than a voltage value of the signal of the second voltage terminal.

For example, in the pixel circuit provided by at least one embodiment of the present disclosure, the second reset sub-circuit comprises a seventh transistor, a gate electrode of the seventh transistor is electrically connected with the reset control signal terminal, a first electrode of the seventh transistor is electrically connected with the third voltage terminal, and a second electrode of the seventh transistor is electrically connected with the first electrode of the light-emitting element.

For example, the pixel circuit provided by at least one embodiment of the present disclosure further comprises a storage sub-circuit, the storage sub-circuit is electrically connected to the control terminal of the driving sub-circuit and the first voltage terminal, and is configured to store a compensation signal acquired based on the data signal.

For example, in the pixel circuit provided by at least one embodiment of the present disclosure, the storage sub-circuit comprises a first capacitor, the data writing sub-circuit comprises a third transistor, and the driving sub-circuit comprises a fourth transistor, the control terminal of the driving sub-circuit comprises a gate electrode of the fourth transistor, the first terminal of the driving sub-circuit comprises a first electrode of the fourth transistor, and the second terminal of the driving sub-circuit comprises a second electrode of the fourth transistor; a gate electrode of the second transistor is electrically connected with the compensation control signal terminal, a second electrode of the second transistor is electrically connected with the second electrode of the fourth transistor, and a first electrode of the second transistor is electrically connected with the gate electrode of the fourth transistor; a first end of the first capacitor is electrically connected with the gate electrode of the fourth transistor, and a second end of the first capacitor is electrically connected with the first voltage terminal; a gate electrode of the third transistor is electrically connected with the first scan signal terminal, a first electrode of the third transistor is electrically connected with the data signal terminal, and a second electrode of the third transistor is electrically connected with the first electrode of the fourth transistor.

For example, in the pixel circuit provided by at least one embodiment of the present disclosure, the first light-emitting control sub-circuit comprises a fifth transistor, and the second light-emitting control sub-circuit comprises a sixth transistor; a gate electrode of the fifth transistor is electrically connected with the light-emitting signal control terminal, a first electrode of the fifth transistor is connected with the first voltage terminal, and a second electrode of the fifth transistor is electrically connected with the first terminal of the driving sub-circuit; a gate electrode of the sixth transistor is electrically connected with the light-emitting signal control terminal, a first electrode of the sixth transistor is electrically connected with the second terminal of the driving sub-circuit, and a second electrode of the sixth transistor is electrically connected with the first electrode of the light-emitting element.

For example, in the pixel circuit provided by at least one embodiment of the present disclosure, a gate electrode of the first transistor is electrically connected with the second scan signal terminal, a first electrode of the first transistor is electrically connected with the second terminal of the driving sub-circuit, and a second electrode of the first transistor is electrically connected with the second voltage terminal.

For example, the pixel circuit provided by at least one embodiment of the present disclosure further comprises a storage sub-circuit and a second reset sub-circuit, the storage sub-circuit comprises a first capacitor, the data writing sub-circuit comprises a third transistor, the driving sub-circuit comprises a fourth transistor, the first light-emitting control sub-circuit comprises a fifth transistor, the second light-emitting control sub-circuit comprises a sixth transistor, and the second reset sub-circuit comprises a seventh transistor; a gate electrode of the first transistor is electrically connected with the second scan signal terminal, a first electrode of the first transistor is electrically connected with a second electrode of the fourth transistor, and a second electrode of the first transistor is electrically connected with the second voltage terminal; a gate electrode of the second transistor is electrically connected with the compensation control signal terminal, a first electrode of the second transistor is electrically connected with a gate electrode of the fourth transistor, and a second electrode of the second transistor is electrically connected with the second electrode of the fourth transistor; a first end of the first capacitor is electrically connected with the gate electrode of the fourth transistor, and a second end of the first capacitor is electrically connected with the first voltage terminal; a gate electrode of the third transistor is electrically connected with the first scan signal terminal, a first electrode of the third transistor is electrically connected with the data signal terminal, and a second electrode of the third transistor is electrically connected with a first electrode of the fourth transistor; a gate electrode of the fifth transistor is electrically connected with the light-emitting signal control terminal, a first electrode of the fifth transistor is connected with the first voltage terminal, and a second electrode of the fifth transistor is electrically connected with the first electrode of the fourth transistor; a gate electrode of the sixth transistor is connected with the light-emitting signal control terminal, a first electrode of the sixth transistor is electrically connected with the second electrode of the fourth transistor, and a second electrode of the sixth transistor is electrically connected with the first electrode of the light-emitting element; a gate electrode of the seventh transistor is electrically connected with the reset control signal terminal, a first electrode of the seventh transistor is electrically connected with a third voltage terminal, and a second electrode of the seventh transistor is electrically connected with the second electrode of the sixth transistor.

For example, in the pixel circuit provided by at least one embodiment of the present disclosure, the third transistor, the fourth transistor, the fifth transistor, the sixth transistor, and the seventh transistor are polysilicon thin film transistors.

For example, in the pixel circuit provided by at least one embodiment of the present disclosure, the signal of the light-emitting signal control terminal is not a pulse modulation signal, and the compensation control signal terminal and the light-emitting signal control terminal are connected to an identical signal line.

At least one embodiment of the present disclosure provides a display device, comprising a plurality of sub-pixels arranged in an array, each sub-pixel comprises the pixel circuit and the light-emitting element according to any embodiment of the present disclosure.

For example, in the display device provided by at least one embodiment of the present disclosure, second scan signal terminals of pixel circuits of sub-pixels located in an i-th row and compensation control signal terminals of pixel circuits of sub-pixels located in an (i-1)-th row are connected to an identical signal line, where i is a positive integer greater than 1 and i is less than or equal to a total number of rows of the plurality of sub-pixels.

At least one embodiment of the present disclosure provides a driving method for driving the pixel circuit according to any embodiment of the present disclosure, a working process of the pixel circuit in one display frame comprises an initialization phase, a data writing phase, and a light-emitting phase, the driving method comprises: in the initialization phase, controlling a level of the signal of the first scan signal terminal to be a first level, controlling a level of the signal of the second scan signal terminal to be the first level, controlling a level of the signal of the compensation control signal terminal to be the first level, and controlling a level of the signal of the light-emitting signal control terminal to be the first level; in the data writing phase, controlling the level of the signal of the first scan signal terminal to be a second level, controlling the level of the signal of the second scan signal terminal to be the second level, controlling the level of the signal of the compensation control signal terminal to be the first level, and controlling the level of the signal of the light-emitting signal control terminal to be the first level; in the light-emitting phase, controlling the level of the signal of the first scan signal terminal to be the first level, controlling the level of the signal of the second scan signal terminal to be the second level, controlling the level of the signal of the compensation control signal terminal to be the second level, and controlling the level of the signal of the light-emitting signal control terminal to be the second level.

For example, in the driving method for driving the pixel circuit provided by at least one embodiment of the present disclosure, in a case where the pixel circuit comprises a second reset sub-circuit, the second reset sub-circuit is configured to write a signal of a third voltage terminal into the first electrode of the light-emitting element in response to a signal of a reset control signal terminal to reset the first electrode of the light-emitting element, the driving method further comprises: controlling the signal of the first scan signal terminal to be identical with the signal of the reset control signal terminal.

For example, in the driving method for driving the pixel circuit provided by at least one embodiment of the present disclosure, the working process of the pixel circuit in the one display frame further comprises a non-light-emitting phase, the driving method further comprises: in the non-light-emitting phase, controlling the level of the signal of the light-emitting signal control terminal to be the first level, controlling the level of the signal of the first scan signal terminal to be the first level, controlling the level of the signal of the second scan signal terminal to be the second level, and controlling the level of the signal of the compensation control signal terminal to be the second level.

For example, in the driving method for driving the pixel circuit provided by at least one embodiment of the present disclosure, the signal of the light-emitting signal control terminal is a pulse width modulation signal.

For example, in the driving method for driving the pixel circuit provided by at least one embodiment of the present disclosure, in a case where the pixel circuit is in a first display mode, the working process of the pixel circuit in the one display frame further comprises a reset phase, the driving method further comprises: in the reset phase, controlling the level of the signal of the light-emitting signal control terminal to be the first level, controlling the level of the signal of the first scan signal terminal to be the second level, controlling the level of the signal of the second scan signal terminal to be the second level, and controlling the level of the signal of the compensation control signal terminal to be the second level.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
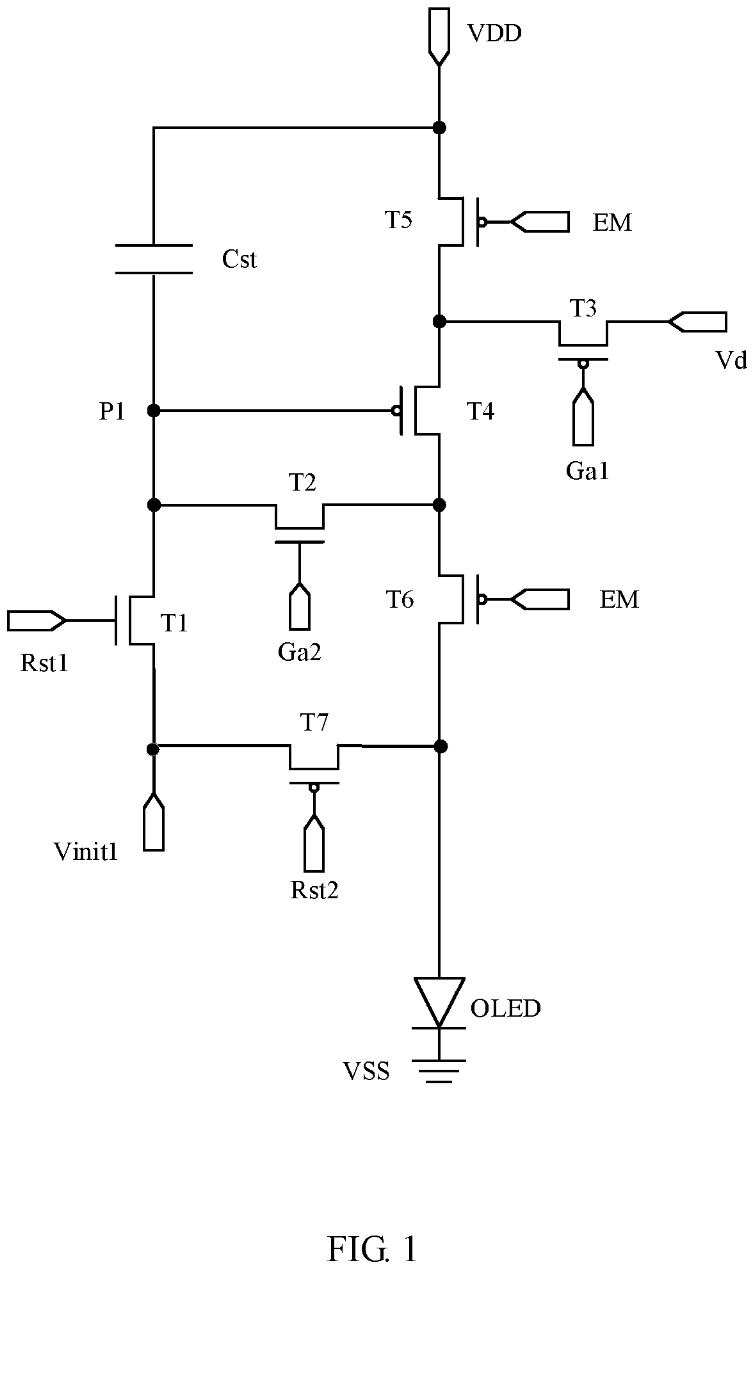
FIG. 1 is a schematic structural diagram of a pixel circuit.

In order to make objects, technical solutions, and advantages of the embodiments of the present disclosure more apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the protection scope of the present disclosure.

Unless otherwise defined, all the technical and scientific terms used in the present disclosure have the ordinary meanings as commonly understood by one of ordinary skill in the art to which the present disclosure belongs. The terms “first,” “second,” etc., which are used in the present disclosure, are not intended to indicate any sequence, amount, or importance, but distinguish various components. The terms “comprise,” “comprising,” “include,” “including,” etc., are intended to specify that the elements or the objects stated before these terms encompass the elements or the objects and equivalents thereof listed after these terms, but do not preclude the other elements or objects. The phrases “connect”, “connected”, etc., are not intended to define a physical connection or mechanical connection, but may include an electrical connection, directly or indirectly. “On,” “under,” “right,” “left” and the like are only used to indicate relative position relationship, and when the position of the object which is described is changed, the relative position relationship may be changed accordingly. In order to keep the following description of the embodiments of the present disclosure clear and concise, the present disclosure omits a detailed description of some well-known functions and well-known components.

In the embodiment of the present disclosure, a transistor refers to an element including at least a gate electrode, a drain electrode, and a source electrode. The transistor has a channel between the drain electrode (drain electrode terminal, drain region, or drain electrode) and the source electrode (source electrode terminal, source region, or source electrode) of the transistor, and a current may flow through the drain electrode, the channel, and the source electrode. It should be noted that, in the present disclosure, the channel refers to a part of the active layer corresponding to an orthographic projection of the gate electrode of the transistor on the active layer, that is, the region where the current mainly flows.

In the present disclosure, a first electrode may be a drain electrode and a second electrode may be a source electrode, or the first electrode may be a source electrode and the second electrode may be a drain electrode. When transistors with opposite polarities are used or the current direction changes during operation of the circuit, etc., the function of “the source electrode” and the function of “the drain electrode” are sometimes interchanged with each other. In the embodiment of the present disclosure, in order to distinguish the transistors, except the gate electrode as the control electrode, one of the first electrode and the second electrode is directly described as the first electrode and the other of the first electrode and the second electrode is directly described as the second electrode, so the first electrode and the second electrode of all or part of the transistors in the embodiment of the present disclosure may be interchanged as needed.

In the present disclosure, “connection” includes the case where constituent components are connected together by an element having a certain electrical effect. The “element having a certain electrical effect” is not particularly limited as long as it can transmit and receive electrical signals between connected constituent components. Examples of “element having a certain electrical effect” include not only electrodes and wirings, but also switching elements such as transistors, resistors, inductors, capacitors, other elements with various functions, and the like.

FIG. 1 is a schematic structural diagram of a pixel circuit. As shown in FIG. 1, the pixel circuit includes seven transistors T1 to T7, a first capacitor Cst, and a light-emitting element OLED.

For the pixel circuit shown in FIG. 1, the gate electrode of the driving transistor T3 (i.e., P1 point in FIG. 1) has two leakage paths, that is, a first leakage path formed by the transistor T1 and a second leakage path formed by the transistor T2. Because of the existence of the two leakage paths, the voltage leakage at the P1 point may be larger in the light-emitting phase of the light-emitting element OLED, and then the current flowing through the light-emitting element OLED becomes smaller, resulting in the problem of screen flickering.

At least one embodiment of that present disclosure provides a pixel circuit including a driving sub-circuit, a data writing sub-circuit, a first light-emitting control sub-circuit, a second light-emitting control sub-circuit, a compensation sub-circuit, and a first reset sub-circuit, and the pixel circuit is configured to generate a driving current to control a light-emitting element to emit light. The first reset sub-circuit includes a first transistor, the compensation sub-circuit includes a second transistor, the first transistor and the second transistor are polysilicon oxide thin film transistors, and an active layer type of the first transistor and an active layer type of the second transistor are different from an active layer type of a transistor comprised in at least one selected from a group consisting of the driving sub-circuit, the data writing sub-circuit, the first light-emitting control sub-circuit, and the second light-emitting control sub-circuit.

In the pixel circuit, by connecting the first reset sub-circuit with the second end of the driving sub-circuit, so that only one leakage path exists at the control terminal of the driving sub-circuit. Because of the reduction of the leakage path, the voltage leakage at the control terminal of the driving sub-circuit 122 is relatively small in the light-emitting phase, and the difference in brightness before and after a frame image is reduced, the flicker problem of the display screen is optimized, and the uniformity of the display image and the display quality of the display panel including the pixel circuit are improved.

Some embodiments of the present disclosure will be described in detail below with reference to the accompanying drawings, but the present disclosure is not limited to these specific embodiments.

Figure 2:
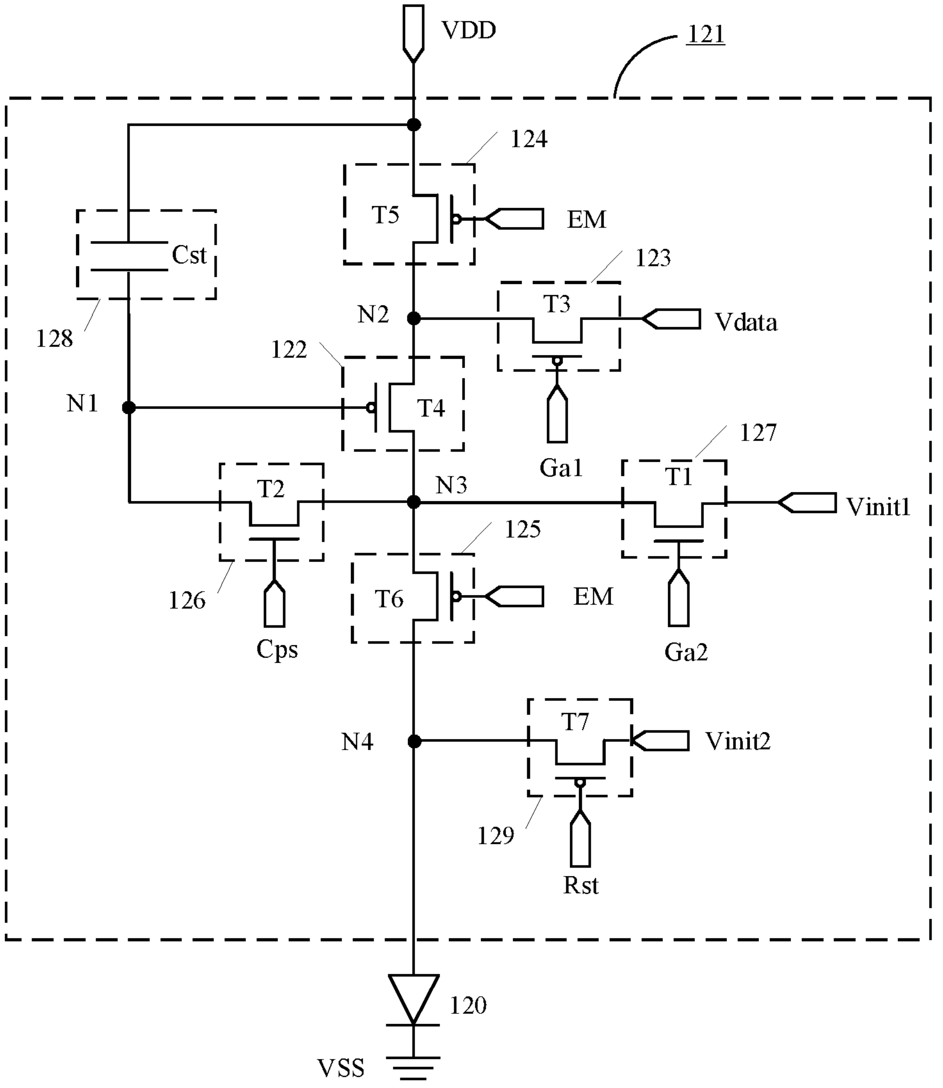
FIG. 2 is a schematic structural diagram of a pixel circuit according to at least one embodiment of the present disclosure.

FIG. 2 is a schematic structural diagram of a pixel circuit provided by at least one embodiment of the present disclosure.

As shown in FIG. 2, the pixel circuit 121 includes a driving sub-circuit 122, a data writing sub-circuit 123, a first light-emitting control sub-circuit 124, a second light-emitting control sub-circuit 125, a compensation sub-circuit 126, and a first reset sub-circuit 127. The pixel circuit 121 is configured to generate a driving current to control the light-emitting element 120 to emit light.

For example, as shown in FIG. 2, the light-emitting element 120 includes a first electrode, a second electrode, and a light-emitting layer disposed between the first electrode and the second electrode, and the second electrode of the light-emitting element 120 is electrically connected to a fourth voltage terminal VSS. When the driving current generated by the pixel circuit 121 flows through the light-emitting element 120, the light-emitting layer of the light-emitting element 120 emits light with brightness corresponding to the magnitude of the driving current.

For example, the light-emitting element 120 may be a light-emitting diode or the like. The light-emitting diode may be a micro light emitting diode (Micro LED), an organic light emitting diode (OLED), a quantum dot light emitting diode (QLED), etc. The light-emitting element 120 is configured to receive a light-emitting signal (for example, the light-emitting signal may be a driving current) and emit light with an intensity corresponding to the light-emitting signal during operation. The first electrode of the light-emitting element 120 may be an anode, and the second electrode of the light-emitting diode may be a cathode. It should be noted that in the embodiment of the present disclosure, the light-emitting layer of the light-emitting element may include an electroluminescent layer itself and other common layers located on both sides of the electroluminescent layer, for example, the other common layers may comprise a hole injection layer, a hole transport layer, an electron injection layer, an electron transport layer, and so on. Generally, the light-emitting element 120 has a light-emitting threshold voltage and emits light when the voltage between the first electrode and the second electrode of the light-emitting element 120 is greater than or equal to the light-emitting threshold voltage. In practical application, the specific structure of the light-emitting element 120 may be designed and determined according to the actual application environment, which is not limited here.

For example, the driving sub-circuit 122 includes a control terminal, a first terminal, and a second terminal, and is configured to provide the light-emitting element 120 with a driving current for driving the light-emitting element 120 to emit light. For example, the control terminal of the driving sub-circuit 122 is electrically connected to a first node N1, the first terminal of the driving sub-circuit 122 is electrically connected to a second node N2, and the second terminal of the driving sub-circuit 122 is electrically connected to a third node N3.

For example, the data writing sub-circuit 123 is electrically connected to the first terminal of the driving sub-circuit and the data signal terminal Vdata, and the data writing sub-circuit 123 is configured to write the data signal of the data signal terminal Vdata into the first terminal of the driving sub-circuit 122 in response to the signal of the first scan signal terminal Ga1.

For example, the compensation sub-circuit 126 is electrically connected to the second terminal of the driving sub-circuit 122 and the control terminal of the driving sub-circuit 122, and the compensation sub-circuit 126 is configured to perform threshold compensation on the driving sub-circuit 122 in response to the signal of the compensation control signal terminal Cps.

For example, the first light-emitting control sub-circuit 124 is electrically connected to the first terminal of the driving sub-circuit 122 and the first voltage terminal VDD, and the first light-emitting control sub-circuit 124 is configured to achieve the connection between the driving sub-circuit 122 and the first voltage terminal VDD to be turned on or off in response to the signal of the light-emitting signal control terminal EM.

For example, the second light-emitting control sub-circuit 125 is electrically connected to the second terminal of the driving sub-circuit 122 and the first electrode of the light-emitting element 120, and the second light-emitting control sub-circuit 125 is configured to achieve the connection between the driving sub-circuit 122 and the light-emitting element 120 to be turned on or off in response to the signal of the light-emitting signal control terminal EM.

For example, the first reset sub-circuit 127 is electrically connected to the second terminal of the driving sub-circuit 122 and the second voltage terminal Vinit1, and the first reset sub-circuit 127 is configured to write the signal of the second voltage terminal Vinit1 into the second terminal of the driving sub-circuit 122 in response to the signal of the second scan signal terminal Ga2 to initialize the second terminal of the driving sub-circuit 122.

For example, the first reset sub-circuit 127 includes a first transistor T1, the compensation sub-circuit 126 includes a second transistor T2, the first transistor T1 and the second transistor T2 are both polysilicon oxide thin film transistors, for example, the first transistor T1 and the second transistor T2 are low temperature polysilicon oxide (LTPO) thin film transistors.

Low temperature poly silicon (LTPS) process is the manufacturing process of a new generation of thin film transistor liquid crystal displays (TFT-LCDs). In the encapsulation process of the LTPS process, an excimer laser is used as the heat source. After the laser passes through the transmission system, laser beams with uniform energy distribution may be generated and projected on the glass substrate with an amorphous silicon structure. When the glass substrate with the amorphous silicon structure absorbs the energy of the excimer laser, the glass substrate will be transformed into polysilicon structure. Because the whole process is completed below 500-600° C., which is lower than the temperature of more than 1000° C. in the traditional polysilicon process, so it is called a low-temperature polysilicon process.

In the field of display technology, the low temperature polysilicon (LTPS) process and the oxide (for example, Indium Gallium Zinc Oxide (IGZO)) process are two processes commonly used to manufacture thin film transistor (TFT) array substrates. LTPO process combines the low-temperature polysilicon process and the oxide process to maximize the advantages of ultra-high mobility of low-temperature polysilicon and small leakage current of oxides (such as indium gallium zinc oxide), thereby achieving better display performance.

For example, an active layer type of the first transistor T1 and an active layer type of the second transistor T2 are different from an active layer type of a transistor comprised in at least one selected from a group consisting of the driving sub-circuit 122, the data writing sub-circuit 123, the first light-emitting control sub-circuit 124, and the second light-emitting control sub-circuit 125, that is, the pixel circuit is a pixel circuit with a plurality of transistor types.

It should be noted that, in the present disclosure, "active layer type" indicates the type of the material used for manufacturing the active layer, and the material of the active layer may include indium gallium zinc oxide, low-temperature polysilicon, amorphous silicon (such as hydrogenated amorphous silicon), low-temperature polysilicon oxide, etc. For example, the active layer type of a thin film transistor using indium gallium zinc oxide as the active layer is different from the active layer type of a thin film transistor using low-temperature polysilicon oxide as the active layer.

In the pixel circuit 121, the first reset sub-circuit 127 is connected with the second terminal of the driving sub-circuit 122, so that only one leakage path exists at the control terminal of the driving sub-circuit 122 (that is, the compensation sub-circuit 126 connected with the control terminal of the driving sub-circuit 122). Because of the reduction of the leakage path, in the light-emitting phase, the voltage leakage of the control terminal of the driving sub-circuit 122 is less, the difference in brightness of a frame image is reduced, the problem of flicker is optimized, the uniformity of the displayed image is improved, and the display quality of the display panel including the pixel circuit is improved.

For example, as shown in FIG. 2, the pixel circuit 121 may further include a second reset sub-circuit 129, the second reset sub-circuit 129 is electrically connected with the first electrode of the light-emitting element 120 and the third voltage terminal Vinit2, and the second reset sub-circuit 129 is configured to write the signal of the third voltage terminal Vinit2 into the first electrode of the light-emitting element 120 in response to the signal of the reset control signal terminal Rst to reset the first electrode of the light-emitting element 120.

For example, the first scan signal terminal Ga1 and the reset control signal terminal Rst may be connected to the same signal line to reduce a group of GOA(Gate Driver on Array) signals, which is beneficial to the narrow frame design of the display panel, reduces the wiring space of the pixel circuit, and improves the resolution of the display panel. In this case, the first scan signal terminal Ga1 and the reset control signal terminal Rst may be the same signal terminal, that is, one signal terminal, such as the reset control signal terminal Rst, may be omitted. In this case, the second reset sub-circuit 129 is configured to write the signal of the third voltage terminal Vinit2 into the first electrode of the light-emitting element 120 in response to the signal of the first scan signal terminal Ga1, so as to reset the first electrode of the light-emitting element 120.

For example, the display panel often has a case of a low image switching frequency such as switching picture display, web browsing, etc. For example, at this time, the switching frequency of images is 5 Hz, and the pixel circuit is in the first display mode, that is, a low-frequency display mode. When the display panel displays the dynamic video or the like, the image switching frequency is relatively high, for example, the switching frequency of the images is 50 Hz at this time, and the pixel circuit is in the second display mode, that is, a high-frequency display mode. Therefore, compared with the second display mode, in the first display mode, the frequency of writing the data signal into the control terminal of the driving sub-circuit 122 is correspondingly reduced. However, in order to avoid the flicker problem, it is usually necessary to keep the first electrode of the light-emitting element 120 in the state of high-frequency reset, that is, the frequency of the signal at the reset control signal terminal Rst in the first display mode remains the same as the frequency of the signal at the reset control signal terminal Rst in the second display mode.

In order to reduce the wiring space of the pixel circuit, the first scan signal terminal Ga1 and the reset control signal terminal Rst may be connected to the same signal line, so that in the first display mode, the frequency of the signal at the first scan signal terminal Ga1 remains the same as the frequency of the signal at the first scan signal terminal Ga1 in the second display mode.

For example, the data writing sub-circuit 123 includes a third transistor T3. When the pixel circuit 121 is in the first display mode, the turn-on frequency of the third transistor T3 included in the data writing sub-circuit 123 is greater than the turn-on frequency of the second transistor T2 included in the threshold compensation sub-circuit, and only when the third transistor T3 and the second transistor T2 are both turned on, the data signal is transmitted to the control terminal of the driving sub-circuit 122. Because writing the data signal to the control terminal of the driving sub-circuit 122 is determined by the turn-on frequency of the second transistor T2, the frequency of the signal at the compensation control signal terminal of the second transistor T2 is reduced according to the display demand of the first display mode, so as to achieve the low-frequency writing of the data signal and the low-frequency display.

It should be noted that the turn-on frequency here refers to the number of times a transistor is turned on per unit time. For example, the higher the frequency of the control signal of the gate electrode of the transistor, the higher the turn-on frequency of the transistor.

For example, the voltage value of the signal at the third voltage terminal Vinit2 is greater than that of the signal at the second voltage terminal Vinit1. By increasing the voltage value at the third voltage terminal Vinit2, the carriers in the light-emitting element 120 are reset, the defects of carriers are reduced, the device stability is increased, and the screen flicker problem is further ameliorated.

For example, the voltage range of the second voltage terminal Vinit1 may be −2V (volts)~−6V, for example, the voltage of the second voltage terminal Vinit1 may be −5V, and the voltage range of the third voltage terminal Vinit2 may be −2V~−5V, for example, the voltage of the third voltage terminal Vinit2 may be −3V.

For example, as shown in FIG. 2, the second reset sub-circuit 129 includes a seventh transistor T7, a gate electrode of the seventh transistor T7 is electrically connected to the reset control signal terminal Rst, a first electrode of the seventh transistor T7 is electrically connected to the third voltage terminal Vinit2, and a second electrode of the seventh transistor T7 is electrically connected to the first electrode of the light-emitting element 120.

For example, the channel width of the seventh transistor T7 ranges from 1.5 μm to 3 μm, the channel length of the seventh transistor T7 ranges from 2 μm to 4 μm, the channel width of the first transistor T1 ranges from 1.5 μm to 3 μm, and the channel length of the first transistor T1 ranges from 2 μm to 4 μm.

For example, the channel length of the first transistor T1 is greater than the channel length of the seventh transistor T7, and the channel length of the sixth transistor T6 is greater than or equal to the channel length of the seventh transistor T7 and less than the channel length of the first transistor T1. Therefore, for the leakage paths existing at the gate electrode of the fourth transistor T4, such as the leakage path 1 to the second voltage terminal Vinit1 through the second transistor T2 and the first transistor T1, and the leakage path 2 to the third voltage terminal Vinit2 through the second transistor T2, the sixth transistor T6, and the seventh transistor T7, by setting the channel length relationship among the first transistor T1, the sixth transistor T6, and the seventh transistor T7, the leakage problem can be further alleviated and the display effect can be improved.

For example, the ratio of the channel length of the first transistor T1 to the channel length of the seventh transistor T7 may be 1 to 2, such as 1.1, 1.3, 1.5, 1.7, and 1.9; the ratio of the channel length of the first transistor T1 to the channel length of the sixth transistor T6 may be 1 to 2, for example, 1.1, 1.3, 1.5, 1.7, and 1.9.

For example, as shown in FIG. 2, the pixel circuit 121 may further include a storage sub-circuit 128, the storage sub-circuit 128 is electrically connected to the control terminal of the driving sub-circuit 122 and the first voltage terminal VDD, and the storage sub-circuit 128 is configured to store a compensation signal acquired based on the data signal.

For example, as shown in FIG. 2, the driving sub-circuit 122 includes the fourth transistor T4, the control terminal of the driving sub-circuit 122 includes the gate electrode of the fourth transistor T4, the first terminal of the driving sub-circuit 122 includes the first electrode of the fourth transistor T4, and the second terminal of the driving sub-circuit 122 includes the second electrode of the fourth transistor T4.

For example, as shown in FIG. 2, the data writing sub-circuit 123 includes a third transistor T3, the gate electrode of the third transistor T3 is electrically connected to the first scan signal terminal Ga1, the first electrode of the third transistor T3 is electrically connected to the data signal terminal Vdata, and the second electrode of the third transistor T3 is electrically connected to the first electrode of the fourth transistor T4, that is, the second electrode of the third transistor T3 is electrically connected to the second node N2.

For example, as shown in FIG. 2, the compensation sub-circuit 126 includes a second transistor T2, the gate electrode of the second transistor T2 is electrically connected to the compensation control signal terminal Cps, the second electrode of the second transistor T2 is electrically connected to the second electrode of the fourth transistor T4, that is, the second electrode of the second transistor T2 is electrically connected to the third node N3, and the first electrode of the second transistor T2 is electrically connected to the gate electrode of the fourth transistor T4, that is, the first electrode of the second transistor T2 is electrically connected to the first node N1.

For example, as shown in FIG. 2, the storage sub-circuit 128 includes a first capacitor Cst, the first end of the first capacitor Cst is electrically connected to the gate electrode of the fourth transistor T4, that is, the first end of the first capacitor Cst is electrically connected to the first node N1, and the second end of the first capacitor Cst is electrically connected to the first voltage terminal VDD.

For example, as shown in FIG. 2, the first light-emitting control sub-circuit 124 includes a fifth transistor T5, and the second light-emitting control sub-circuit 125 includes a sixth transistor T6. For example, the gate electrode of the fifth transistor T5 is electrically connected to the light-emitting signal control terminal EM, the first electrode of the fifth transistor T5 is connected to the first voltage terminal VDD, and the second electrode of the fifth transistor T5 is electrically connected to the first terminal of the driving sub-circuit 122, that is, the second electrode of the fifth transistor T5 is electrically connected to the second node N2; the gate electrode of the sixth transistor T6 is electrically connected to the light-emitting signal control terminal EM, the first electrode of the sixth transistor T6 is electrically connected to the second terminal of the driving sub-circuit 122, that is, the first electrode of the sixth transistor T6 is electrically connected to the third node N3, and the second electrode of the sixth transistor T6 is electrically connected to the first electrode of the light-emitting element 120.

For example, as shown in FIG. 2, the gate electrode of the first transistor T1 is electrically connected to the second scan signal terminal Ga2, the first electrode of the first transistor T1 is electrically connected to the second terminal of the driving sub-circuit 122, that is, the gate electrode of the first transistor T1 is electrically connected to the third node N3, and the second electrode of the first transistor T1 is electrically connected to the second voltage terminal Vinit1.

For example, when the signal of the light-emitting signal control terminal EM is not a pulse width modulation signal, that is, the signal of the light-emitting signal control terminal EM is a pulse signal with a fixed duty cycle, the compensation control signal terminal Cps and the light-emitting signal control terminal EM may be connected to the same signal line. At this time, under the control of the signal at the light-emitting signal control terminal EM, before the third transistor T3 is turned on, the second transistor T2 is already turned on, thus reducing the waste of turn-on time of one transistor when the data signal is written, reducing the loss of charging time caused by the rising edge of the signal at the control terminal not reaching a turn-on level immediately, increasing the charging time, which is more conducive to the image display in the high-frequency display mode.

For example, taking FIG. 2 as an example, the connection relationship among the transistor T1 to the transistor T7, the first capacitor Cst, and the respective signal control terminals will be described in detail below.

For example, the storage sub-circuit 128 of the pixel circuit includes the first capacitor Cst, the data writing sub-circuit 123 includes the third transistor T3, the driving sub-circuit 122 includes the fourth transistor T4, the first light-emitting control sub-circuit 124 includes the fifth transistor T5, the second light-emitting control sub-circuit 125 includes the sixth transistor T6, and the second reset sub-circuit 129 includes the seventh transistor T7.

The gate electrode of the first transistor T1 is electrically connected with the second scan signal terminal Ga2, the first electrode of the first transistor T1 is electrically connected with the second electrode of the fourth transistor T4, and the second electrode of the first transistor T1 is electrically connected with the second voltage terminal Vinit1; the gate electrode of the second transistor T2 is electrically connected with the compensation control signal terminal Cps, the first electrode of the second transistor T2 is electrically connected with the gate electrode of the fourth transistor T4, and the second electrode of the second transistor T2 is electrically connected with the second electrode of the fourth transistor T4; the first end of the first capacitor Cst is electrically connected with the gate electrode of the fourth transistor T4, and the second end of the first capacitor Cst is electrically connected with the first voltage terminal VDD; the gate electrode of the third transistor T3 is electrically connected with the first scan signal terminal Ga1, the first electrode of the third transistor T3 is electrically connected with the data signal terminal Vdata, and the second electrode of the third transistor T3 is electrically connected with the first electrode of the fourth transistor T4; the gate electrode of the fifth transistor T5 is electrically connected with the light-emitting control signal terminal EM, the first electrode of the fifth transistor T5 is electrically connected with the first voltage terminal Vinit1, and the second electrode of the fifth transistor T5 is electrically connected with the first electrode of the fourth transistor T4; the gate electrode of the sixth transistor T6 is connected to the light-emitting signal control terminal EM, the first electrode of the sixth transistor T6 is electrically connected to the second electrode of the fourth transistor T4, and the second electrode of the sixth transistor T6 is electrically connected to the first electrode of the light-emitting element 120; the gate electrode of the seventh transistor T7 is electrically connected with the reset control signal terminal Rst, the first electrode of the seventh transistor T7 is electrically connected with the third voltage terminal Vinit2, and the second electrode of the seventh transistor T7 is electrically connected with the second electrode of the sixth transistor T6.

For example, a plurality of pixel circuits 121 and a plurality of light-emitting elements 120 shown in FIG. 2 constitute a plurality of sub-pixels, and the plurality of sub-pixels are arranged in an array. For a pixel circuit located in an n-th row, the signal of the second scan signal terminal of the pixel circuit is the same as the signal of the compensation control signal terminal Cps of a pixel circuit located in a (n-1)-th row, that is, the second scan signal terminal of the pixel circuit located in the n-th row and the compensation control signal terminal Cps of the pixel circuit located in the (n-1)-th row are connected to the same signal line to receive the same signal, thereby reducing the number of signal lines.

For example, the third transistor T3 to the seventh transistor T7 are all polysilicon thin film transistors, such as low temperature polysilicon (LTPS) thin film transistors.

In this embodiment, compared with the LTPS thin film transistor, the LTPO thin film transistor generates less leakage current. Therefore, setting the second transistor T2 as LTPO thin film transistor can significantly reduce the leakage current.

For example, one of the voltage output from the first voltage terminal VDD and the voltage output from the fourth voltage terminal VSS is a high voltage, and the other is a low voltage. For example, in the embodiment shown in FIG. 2, the voltage output from the first voltage terminal VDD is a constant first voltage VDD, for example, the first voltage is a positive voltage; while the voltage output from the fourth voltage terminal VSS is a constant second voltage VS, for example, the second voltage is a negative voltage, etc. For example, in some examples, the fourth voltage terminal VSS may be grounded.

For example, in the specific implementation, in the embodiment of the present disclosure, the voltage Vi output from the third voltage terminal Vinit2 and the second voltage Vs output from the fourth voltage terminal VSS may satisfy the following formula: $Vi-Vs<VEL$, so that the light-emitting element 120 can be prevented from emitting light in the non-light-emitting phase (for example, the initialization phase s1 to be described below, etc.). VEL represents the light-emitting threshold voltage of the light-emitting element 120.

For example, according to the characteristics of the transistor, the transistors may be divided into N-type transistors and P-type transistors. For the sake of clarity, the embodiment of the present disclosure elaborates the technical solution of the present disclosure in detail by taking a case that the first transistor and the second transistor are N-type transistors (for example, N-type MOS transistors), and other transistors included in the pixel circuit are all P-type transistors (for example, P-type MOS transistors) as an example. That is to say, in the description of the present disclosure, the first transistor T1 and the second transistor T2 are LTPO thin film transistors, such as, N-type transistors, and the third transistor T3 to the seventh transistor T7 may be LTPS transistors, such as, P-type transistors. However, the transistors in the embodiments of the present disclosure are not limited to this, and those skilled in the art may also use P-type transistors as the first transistor T1 and the second transistor T2 and use N-type transistors as the third transistor T3 to the seventh transistor T7 according to the actual application environment, and the present disclosure is not limited thereto.

Figure 3:
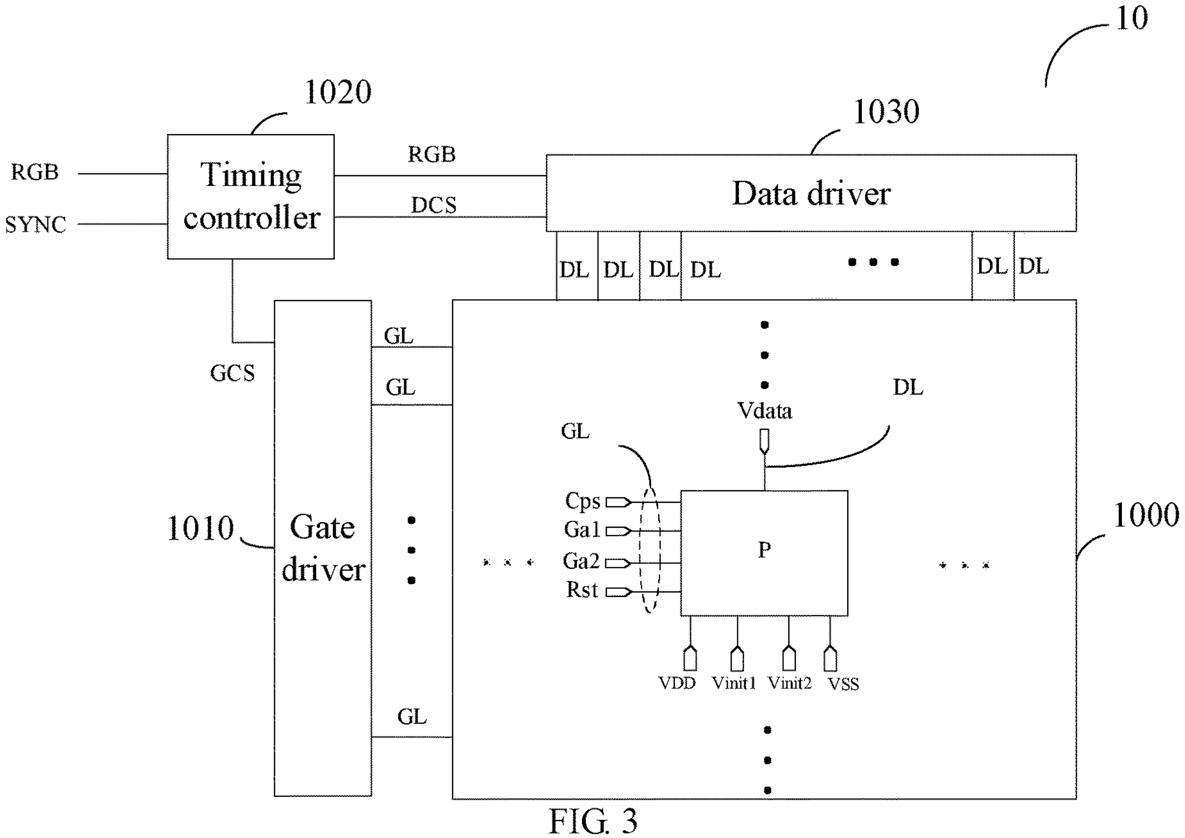
FIG. 3 is a schematic block diagram of a display device according to at least one embodiment of the present disclosure.

FIG. 3 is a schematic block diagram of a display device provided by at least one embodiment of the present disclosure.

For example, the display device 10 may be an active-matrix organic light emitting diode (AMOLED) display device or the like.

As shown in FIG. 3, the display device 10 includes a display panel 1000, a gate driver 1010, a timing controller 1020, and a data driver 1030. The display panel 1000 includes sub-pixels P defined according to the intersection of a plurality of scan lines GL and a plurality of data lines DL;

the gate driver 1010 is used to drive the plurality of scan lines GL; the data driver 1030 is used to drive the plurality of data lines DL; the timing controller 1020 is used to process the image data RGB input from the outside of the display device 10, provide the processed image data RGB to the data driver 1030, and output the scan control signal GCS and the data control signal DCS to the gate driver 1010 and the data driver 1030 to control the gate driver 1010 and the data driver 1030.

For example, the display panel 1000 may include a base substrate (not shown), and a plurality of sub-pixels P arranged in an array and included in the display device 10 are disposed on the base substrate, each sub-pixel P includes a light-emitting element 120 and a pixel circuit 121. For example, the pixel circuit 121 may be the pixel circuit provided by any embodiment of the present disclosure as mentioned above, and details will not be repeated here.

For example, the base substrate may be a flexible substrate or a rigid substrate. For example, the base substrate may be made of glass, plastic, quartz, or other suitable materials, and the embodiments of the present disclosure do not limit this.

For example, on the base substrate, the light-emitting element 120 and the pixel circuit 121 are stacked, and the light-emitting element 120 is located on the side of the pixel circuit 121 away from the base substrate 10. The pixel circuit 121 is configured to drive the light-emitting element 120 to emit light.

As shown in FIG. 3, the display panel 1000 further includes the plurality of scan lines GL and the plurality of data lines DL. For example, the sub-pixel P is disposed at the intersection region of the scan line GL and the data line DL. For example, each sub-pixel P is connected to four scan lines GL (the first scan terminal Ga1, the second scan terminal Ga2, the compensation control signal terminal Cps, and the reset control signal terminal Rst, respectively), a data line DL, a first voltage terminal for providing the first voltage VDD, a second voltage terminal for providing the first initial voltage Vinit1, a third voltage terminal for providing the second initial voltage Vinit2, and a fourth voltage terminal VSS for providing the second voltage. For example, the first voltage terminal to the fourth voltage terminal may be provided with voltages by corresponding power lines (for example, provided by a power management chip) or may be corresponding plate-shaped common electrodes (for example, common anode or common cathode). It should be noted that only part of the sub-pixels P, part of the scan lines GL, and part of the data lines DL are shown in FIG. 3.

For example, the second scan signal terminals of the pixel circuits of the sub-pixels located in the i-th row and the compensation control signal terminals of the pixel circuits of the sub-pixels located in the (i-1)-th row are connected to the same signal line, here i is a positive integer greater than 1 and i is less than or equal to the total number of rows of the plurality of sub-pixels.

For example, for the pixel circuit of the sub-pixel located in the i-th row, the signal of the compensation control signal terminal Cps of the pixel circuit is Cps[i], and the signal of the second scan signal terminal Ga2 of the pixel circuit is Cps[i-1], that is, the signal of the compensation control signal terminal of the sub-pixel located in the (i-1)-th row.

The second scan signal terminal Ga2 and the compensation control signal terminal Cps are connected to the same signal line, which reduces the number of signal lines in the display device 10, reduces the wiring space of pixel circuits, and achieves the narrow frame design of the display device 10.

For example, the gate driver 1010 provides a plurality of gate signals to the plurality of scan lines GL according to a plurality of scan control signals GCS from the timing controller 1020. The plurality of gate signals include scan signals, reset signals, and the like. These signals are supplied to each sub-pixel P through the plurality of scan lines GL.

For example, the data driver 1030, using the reference gamma voltage, converts the digital image data RGB input from the timing controller 1020 into data signals according to a plurality of data control signals DCS from the timing controller 1020. The data driver 1030 supplies the converted data signals to the plurality of data lines DL.

For example, the timing controller 1020 processes externally inputted image data RGB to match the size and resolution of the display panel 1000, and then provides the processed image data to the data driver 1030. The timing controller 1020 generates a plurality of scan control signals GCS and a plurality of data control signals DCS using synchronization signals (such as, the dot clock DCLK, the data enable signal DE, the horizontal synchronization signal Hsync, and the vertical synchronization signal Vsync) input from the outside of the display device 10. The timing controller 1020 provides the generated scan control signal GCS and the generated data control signal DCS to the gate driver 1010 and the data driver 1030, respectively, for the control of the gate driver 1010 and the data driver 1030.

For example, the data driver 1030 may be connected with a plurality of data lines DL to provide data signals.

For example, the gate driver 1010 and the data driver 1030 may be implemented as semiconductor chips. The display device 10 may also include other components, such as a signal decoding circuit, a voltage conversion circuit, etc. These components may be, for example, conventional components, which will not be described in detail here.

For example, the display device 10 may be applied to any products or components with a display function, such as an e-book, a mobile phone, a tablet computer, a television, a monitor, a notebook computer, a digital photo frame, a navigator, etc.

Regarding the technical effects of the display device 10 provided in the above embodiments, reference may be made to the technical effects of the pixel circuit provided in the embodiments of the present disclosure, and similar portions will not be repeated here.

At least one embodiment of the present disclosure also provides a driving method of the pixel circuit, and the driving method is used to drive the pixel circuit provided according to any embodiment of the present disclosure.

Figure 4A:
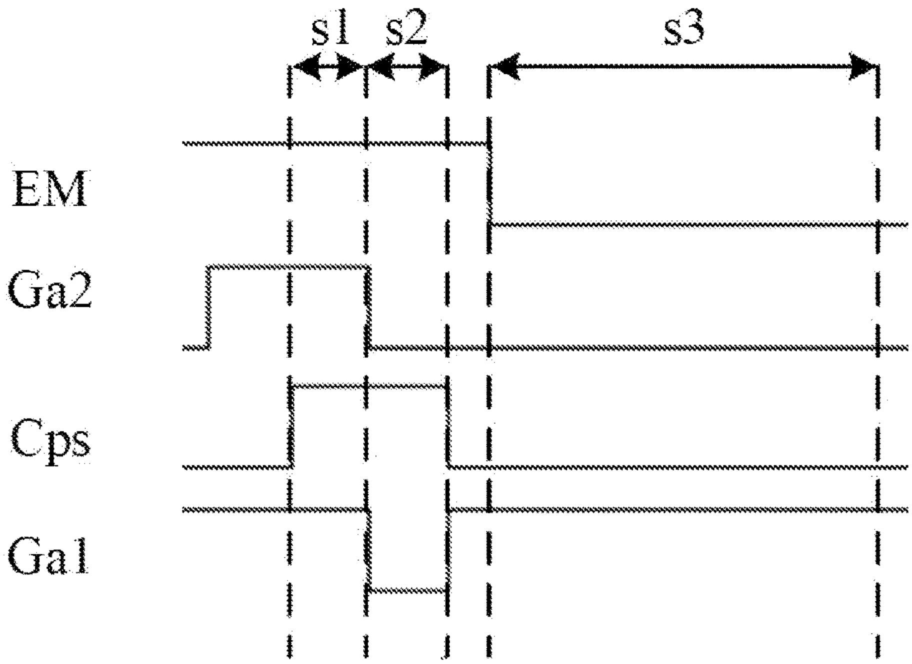
FIG. 4A to FIG. 4C are circuit timing diagrams of a pixel circuit according to at least one embodiment of the present disclosure.
Figure 4B:
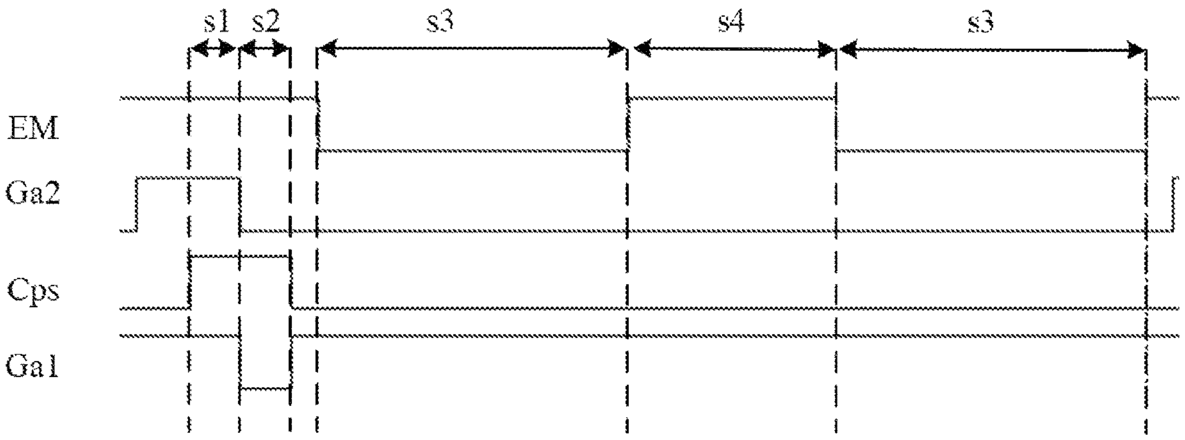
Figure 4C:
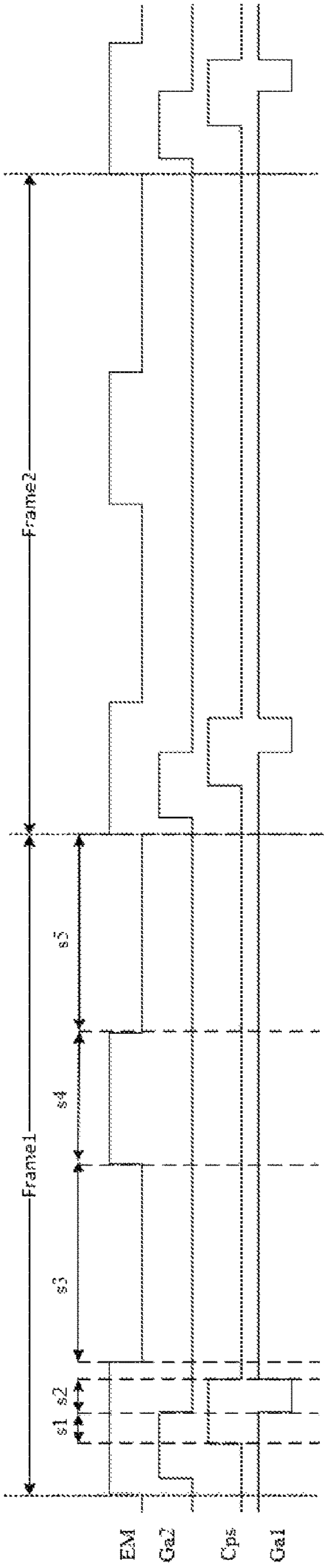

FIGS. 4A to 4C are circuit timing diagrams of a pixel circuit provided by some embodiments of the present disclosure.

Next, the working process of the pixel circuit in one display frame will be described in detail by taking a case that the first transistor T1 and the second transistor T2 are N-type transistors (LTPO thin film transistors) and the third transistor T3 to the seventh transistor T7 are P-type transistors (such as LTPS thin film transistors) in the pixel circuit provided by the embodiment of the present disclosure as an example and in combination with the pixel circuit shown in FIG. 2 and the working timing diagrams shown in FIG. 4A to FIG. 4C.

As shown in FIG. 2, the pixel circuit provided by the embodiment of the present disclosure includes seven transistors (the first transistor T1 to the seventh transistor T7), a storage capacitor (the first capacitor Cst), and five power supply terminals (the first voltage terminal VDD, the second voltage terminal Vinit1, the third voltage terminal Vinit2, the fourth voltage terminal VSS, and the data signal terminal Vdata). For example, the first voltage terminal VDD continuously provides a high-level first voltage VDD, and the fourth voltage terminal VSS continuously provides a low-level second voltage Vs.

For example, as shown in FIG. 4A, EM represents the signal (hereinafter referred to as a light-emitting control signal) of light-emitting signal control terminal EM, Ga1 represents the signal (hereinafter referred to as a first scan signal) of the first scan signal terminal Ga1, Ga2 represents the signal (hereinafter referred to as a second scan signal) of the second scan signal terminal Ga2, and Cps represents the signal (hereinafter referred to as a compensation control signal) of the compensation control signal terminal Cps. It should be noted that, in the embodiment of the present disclosure, reference numerals EM, Ga1, Ga2, and Cps indicate both the signal terminal and the signal of the signal terminal.

For example, when the pixel circuit 121 includes the second reset sub-circuit 129, the signal of the first scan signal terminal Ga1 is controlled to be the same as the signal of the reset control signal terminal Rst. For example, the first scan signal terminal Ga1 and the reset control signal terminal Rst are connected to the same signal line. For example, the circuit timing of the reset control signal Rst output from the reset control signal terminal Rst is the circuit timing of the first scan signal Ga1 shown in FIG. 4A to FIG. 4C.

For example, in the following description, the first level represents a high level and the second level represents a low level.

For example, as shown in FIG. 4A, the working process of a pixel circuit in a display frame may include an initialization phase s1, a data writing phase s2, and a light-emitting phase s3. That is, the driving method includes the initialization phase s1, the data writing phase s2, and the light-emitting phase s3.

In the initialization phase s1, controlling a level of the signal of the first scan signal terminal Ga1 to be a first level, controlling a level of the signal of the second scan signal terminal Ga2 to be the first level, controlling a level of the signal of the compensation control signal terminal Cps to be the first level, and controlling a level of the signal of the light-emitting signal control terminal EM to be the first level. That is to say, the first scan signal Ga1, the reset control signal Rst, the second scan signal Ga2, the compensation control signal Cps, and the light-emitting signal control EM are all at the high level.

Therefore, in the initialization phase s1, the first transistor T1 is turned on under the control of the high level of the second scan signal Ga2, and the second transistor T2 is also turned on under the control of the high level of the compensation control signal terminal Cps, so that the first initial voltage Vi1 output from the second voltage terminal Vinit1 may be supplied to the gate electrode of the fourth transistor T4, that is, the first node N1, through the turned-on first transistor t1 and the turned-on second transistor T2. Therefore, the voltage of the gate electrode of the fourth transistor T4 is the first initial voltage Vi1, and the initialization of the gate electrode of the fourth transistor T4 is implemented. The third transistor T3 is turned off under the control of the high level of the first scan signal Ga1, the fifth transistor T5 is turned off under the control of the high level of the light-emitting control signal EM, the sixth transistor T6 is turned off under the control of the high level of the light-emitting control signal EM, and the seventh transistor T7 is turned off under the control of the high level of the reset control signal Rst.

In the data writing phase s2, controlling the level of the signal of the first scan signal terminal Ga1 to be a second level, controlling the level of the signal of the second scan signal terminal Ga2 to be the second level, controlling the level of the signal of the compensation control signal terminal Cps to be the first level, and controlling the level of the signal of the light-emitting signal control terminal EM to be the first level. That is to say, the first scan signal Ga1, the reset control signal Rst, and the second scan signal Ga2 are at the low level, and the compensation control signal Cps and the light-emitting control signal EM are at the high level.

Therefore, in the data writing phase s2, the third transistor T3 is turned on under the control of the low level of the first scan signal Ga1 to provide the data voltage Vda on the data signal terminal Vdata to the first electrode of the fourth transistor T4, that is, the second node N2, so that the voltage of the first electrode of the fourth transistor T4 is the data voltage Vda. The second transistor T2 is turned on under the control of the high level of the compensation control signal Cps, so that the fourth transistor T4 may be at a diode connection mode, and therefore, the voltage Vda of the first electrode of the fourth transistor T4 charges the gate electrode of the fourth transistor T4 until the voltage of the gate electrode of the fourth transistor T4 is Vda+Vth, and the voltage Vda+Vth of the gate electrode of the fourth transistor T4 is stored by the first capacitor Cst. At the same time, the seventh transistor T7 is turned on under the control of the low level of the reset control signal Rst, so that the second initial voltage Vi2 output from the third voltage terminal Vinit2 may be provided to the first electrode of the light-emitting element 121 through the turned-on seventh transistor T7 to reset the first electrode of the light-emitting element 121. The first transistor T1 is turned off under the control of the low level of the second scan signal terminal Ga2, the fifth transistor T5 is turned off under the control of the high level of the light-emitting control signal EM, and the sixth transistor T6 is turned off under the control of the high level of the light-emitting control signal EM.

In the light-emitting phase s3, controlling the level of the signal of the first scan signal terminal Ga1 to be the first level, controlling the level of the signal of the second scan signal terminal Ga2 to be the second level, controlling the level of the signal of the compensation control signal terminal Cps to be the second level, and controlling the level of the signal of the light-emitting signal control terminal EM to be the second level. That is to say, the first scan signal Ga1 and the reset control signal Rst are at the high level, and the second scan signal Ga2, the compensation control signal Cps, and the light-emitting control signal EM are all at the low level.

Therefore, the fifth transistor T5 is turned on under the control of the low level of the light-emitting control signal EM, so that the fifth transistor T5 may provide the first voltage VDD output from the first voltage terminal VDD to the first electrode of the fourth transistor T4, and thus the voltage of the first electrode of the fourth transistor T4 is the first voltage VDD. At this time, the voltage of the first electrode of the fourth transistor T4 is the first voltage VDD, and based on the holding effect of the first capacitor Cst, the voltage of the gate electrode of the fourth transistor T4 is Vda+Vth, so that the fourth transistor T4 may be in a saturated state, so that the fourth transistor T4 generates the driving current Ids: $Ids=K*((Vda+Vth-VDD)-Vth)^2=K*(Vda-VDD)^2$, K is a structural constant related to the process and the design. The sixth transistor T6 is turned on under the control of the low level of the light-emitting control signal EM, so that the sixth transistor T6 may conduct the second electrode of the fourth transistor T4 with the first electrode of the light-emitting element 120, so that the driving current Ids flows into the light-emitting element 120 to drive the light-emitting element 120 to emit light. The first transistor T1 is turned off under the control of the low level of the second scan signal Ga2, the second transistor T2 is turned off under the control of the low level of the compensation control signal Cps, the third transistor T3 is turned off under the control of the high level of the first scan signal Ga1, and the seventh transistor T7 is turned off under the control of the high level of the reset control signal Rst.

For example, through the above-mentioned initialization phase, data writing phase, and light-emitting phase, the pixel circuit completes the refresh and display of the data signals. In order to maintain the stability of the displayed image, the working process of the pixel circuit in one display frame may also include a non-light-emitting phase s4 and a light-emitting phase s3 as shown in FIG. 4B. At this time, the data signal is no longer refreshed, and the image corresponding to the current data signal is maintained to display.

For example, the driving method further includes a non-light-emitting phase s4. In the non-light-emitting phase s4, controlling the level of the signal of the first scan signal terminal Ga1 to be the first level, controlling the level of the signal of the second scan signal terminal Ga2 to be the second level, controlling the level of the signal of the compensation control signal terminal Cps to be the second level, and controlling the level of the signal of the light-emitting signal control terminal EM to be the first level. That is to say, the first scan signal Ga1, the reset control signal Rst, and the light-emitting control signal EM are all at the high level, and the second scan signal Ga2 and the compensation control signal Cps are at the low level.

Therefore, in the non-light-emitting phase s4, the first transistor T1 is turned off under the control of the low level of the second scan signal Ga2, the second transistor T2 is turned off under the control of the low level of the compensation control signal Cps, the third transistor T3 is turned off under the control of the high level of the first scan signal Ga1, the fifth transistor T5 is turned off under the control of the high level of the light-emitting control signal EM, the sixth transistor T6 is turned off under the control of the high level of the light-emitting control signal EM, and the seventh transistor T7 is turned off under the control of the high level of the reset control signal Rst. That is to say, in the non-light-emitting phase s4, the first transistor T1 to the third transistor T3 and the fifth transistor T5 to the seventh transistor T7 in the pixel circuit are all turned off. Because of the storage function of the first capacitor Cst, the fourth transistor T4 is still in the saturated state in the light-emitting phase s3.

The process of the light-emitting phase s3 after the non-light-emitting phase s4 is the same as that of the above-mentioned light-emitting phase s3. Both the fifth transistor T5 and the sixth transistor T6 are turned on under the control of the low level of the light-emitting control signal EM, so that the driving current Ids flows into the light-emitting element 120 to drive the light-emitting element 120 to emit light, and the detailed process will not be described again.

For example, as shown in FIG. 4C, the display screen includes a plurality of display frames. In the second display mode, the plurality of display frames may be a display frame frame1, a display frame frame2, etc. as shown in FIG. 4C. In the chronological order, each display frame includes the following phases: the initialization phase s1, the data writing phase s2, the light-emitting phase s3, the non-light-emitting phase s4, and the light-emitting phase s3. For the display frame frame2, the phase division and phase composition are exactly the same as those of the display frame frame1, and FIG. 4C does not show the division of the various phases of the display frame frame2.

For example, taking the signal period of the light-emitting control signal EM as the criterion, in the second display mode, each display frame includes two signal periods, and in the first signal period, the data signal is refreshed through the initialization phase s1, the data writing phase s2, and the light-emitting phase s3; in the second signal period, the maintenance of the data signal and the display of the image corresponding to the data signal are completed through the non-light-emitting phase s4 and the light-emitting phase s3.

It should be noted that the schematic diagram of the display frame provided by the present disclosure is only exemplary, and can be adjusted according to actual needs, for example, more or less signal periods may be provided to achieve the matching between the frequency of the light-emitting control signal and the refresh frequency of the display frame, and the present disclosure does not limit this.

In order to ensure the driving ability of the thin film transistor in low gray scale display, the circuit may use the PWM signal for dimming to ensure the display quality. For example, the signal of the light-emitting signal control terminal EM may be a pulse width modulation (PWM) signal, that is, the duty cycle of the pulse of the signal of the light-emitting signal control terminal EM may be modulated according to the design requirement.

When the signal of the light-emitting control signal terminal EM is a PWM signal, the circuit timing diagram shown in FIG. 4A to FIG. 4C may still be adopted. By adjusting the ratio of the low level/high level time of the PWM signal to the signal period, dimming is implemented to improve the image quality of the display picture.

For example, in the first display mode, as mentioned above, in order to reduce the wiring space of the pixel circuit, the first scan signal terminal Ga1 and the reset control signal terminal Rst may be connected to the same signal line, so that the frequency of the signal at the first scan signal terminal Ga1 remains the same as the frequency of the signal at the first scan signal terminal Ga1 in the second display mode.

When both the second transistor T2 and the third transistor T3 are turned on, the data signal can be transmitted to the gate electrode of the fourth transistor T4. Therefore, by reducing the turn-on frequency of the second transistor T2, the frequency of writing the data signal to the gate electrode of the fourth transistor T4 may be reduced.

For example, the frequency of the threshold compensation signal Cps is controlled to be less than or equal to the frequency of the first scan signal Ga1, and the frequency of the first scan signal Ga1 is controlled to be less than or equal to the frequency of the light-emitting control signal EM, thereby achieving the first display mode.

For example, when the pixel circuit is in the first display mode, the working process of the pixel circuit in one display frame further includes a reset phase s5, so as to implement to reset the first electrode of the light-emitting element 120 without refreshing the data signal.

Figure 4D:
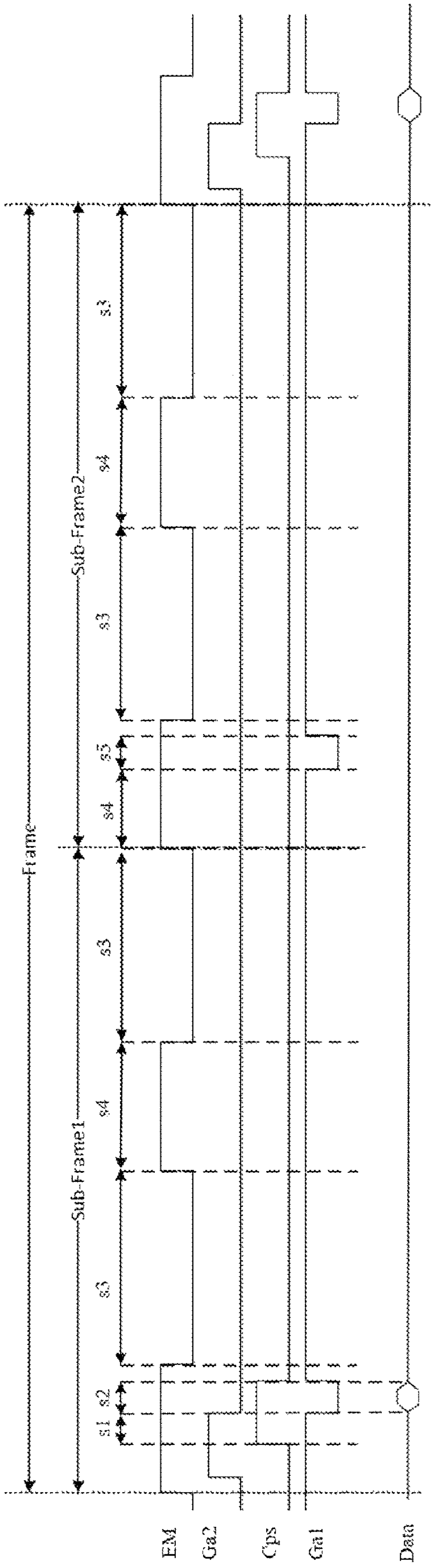
FIG. 4D is a circuit timing diagram of another pixel circuit according to at least one embodiment of the present disclosure.

FIG. 4D is a circuit timing diagram of another pixel circuit provided by at least one embodiment of the disclosure, that is, the circuit timing diagram of the pixel circuit in the first display mode.

For example, as shown in FIG. 4D, in the first display mode, each display frame included in the display screen may be the display frame "frame" shown in FIG. 4D. Taking the signal period of the light-emitting control signal EM as the criterion, in the first display mode, each display frame includes at least four signal periods. For example, each display frame frame includes a first sub-frame Sub-Frame1 and at least one second sub-frame Sub-Frame2. The first sub-frame Sub-Frame1 is configured to complete the refreshing of the data signal, and the second sub-frame Sub-Frame2 is configured to maintain the display of the image corresponding to the data signal and reset the first electrode of the light-emitting element 120. It should be noted that in the first display mode, the number of the second sub-frame Sub-Frame2 in each display frame may be set according to actual design requirements. In addition, the relative positional relationship between the first sub-frame Sub-Frame1 and the second sub-frame Sub-Frame2 in each display frame may also be set according to actual conditions, and the present disclosure does not limit this.

For example, the "Data" in FIG. 4D represents the change of the gate voltage of the fourth transistor T4, and the hexagon represents that the signal is written to the gate electrode of the fourth transistor T4 at this time, that is, the data signal of the data signal terminal is transmitted to the gate electrode of the fourth transistor T4 through the third transistor T3 and the second transistor T2.

For example, as shown in FIG. 4D, in the chronological order, the first sub-frame Sub-Frame1 includes an initialization phase s1, a data writing phase s2, a light-emitting phase s3, a non-light-emitting phase s4, and a light-emitting phase s3. The signal level change at each phase and the the state change of the transistors and the light-emitting element 120 caused by the signal level change are as described above, and will not be described here again.

For example, as shown in FIG. 4D, in the chronological order, the second sub-frame Sub-Frame2 includes a non-light-emitting phase s4, a reset phase s5, a light-emitting phase s3, a non-light-emitting phase s4, and a light-emitting phase s3. Here, the related descriptions of the light-emitting phase s3 and the non-light-emitting phase s4 are as described above, and will not be repeated here.

For example, the driving method further includes a reset phase s5. In the reset phase s5, controlling the level of the signal of the light-emitting signal control terminal EM to be the first level, controlling the level of the signal of the first scan signal terminal Ga1 to be the second level, controlling the level of the signal of the second scan signal terminal Ga2 to be the second level, and controlling the level of the signal of the compensation control signal terminal Cps to be the second level. That is to say, the light-emitting control signal EM is at the high level, and the first scan signal Ga1, the reset control signal Rst, the second scan signal Ga2, and the compensation control signal Cps are all at the low level.

Therefore, in the reset phase s5, the seventh transistor T7 is turned on under the control of the low level of the reset control signal Rst, so that the second initial voltage Vi2 output from the third voltage terminal Vinit2 may be supplied to the first electrode of the light-emitting element 121 through the turned-on seventh transistor T7 to reset the first electrode of the light-emitting element 121. At the same time, the fourth transistor T4 is turned on under the control of the low level of the first scan signal Ga1 to provide the data voltage Vda on the data signal terminal Vdata to the first electrode of the fourth transistor T4, that is, the second node N2. However, at this time, because the second transistor T2 is turned off under the control of the low level of the compensation control signal Cps, the data voltage Vda cannot be transmitted to the gate electrode of the fourth transistor T4 to achieve the refresh of the data signal, thereby reducing the refresh frequency of the data signal and achieving the first display mode. The first transistor T1 is turned off under the control of the low level of the second scan signal Ga2, the third transistor T3 is turned off under the control of the high level of the first scan signal Ga1, the fifth transistor T5 is turned off under the control of the high level of the light-emitting control signal EM, and the sixth transistor T6 is turned off under the control of the high level of the light-emitting control signal EM.

It can be seen from FIG. 4D, in the first display mode, the first scan control signal Ga1 still maintains a high-frequency refresh frequency, so as to reset the first electrode of the light-emitting element 120 and avoid the flicker problem in the first display mode. By reducing the frequency of the threshold compensation signal Cps, the low-frequency refresh of the data signal is implemented on the premise that the first electrode of the light-emitting element 120 is reset at a high frequency.

In addition, the transistors in the embodiment of the present disclosure are described by taking a case that the first transistor T1 and the second transistor T2 are N-type transistors and the third transistor T3 to the seventh transistor T7 are P-type transistors as an example, in this case the first electrode of the transistor is the source electrode, and the second electrode of the transistor is the drain electrode. It should be noted that the present disclosure includes but is not limited to this. For example, the first transistor T1 and the second transistor T2 may be P-type transistors, and the third transistor T3 to the seventh transistor T7 may all be N-type transistors, in this case, the first electrode of the transistor is the drain electrode, and the second electrode of the transistor is the source electrode, as long as respective electrodes of a selected type transistor are correspondingly connected in accordance with respective electrodes of a corresponding transistor in the embodiments of the present disclosure, and the corresponding voltage terminals provide corresponding high or low voltages.

It should be noted that the circuit timing diagrams shown in FIG. 4A to FIG. 4D provided by the present disclosure are only schematic, and the specific timing of the pixel circuit may be set, modified, and combined according to actual application scenarios, and is not specifically limited by the present disclosure.

Figure 5:
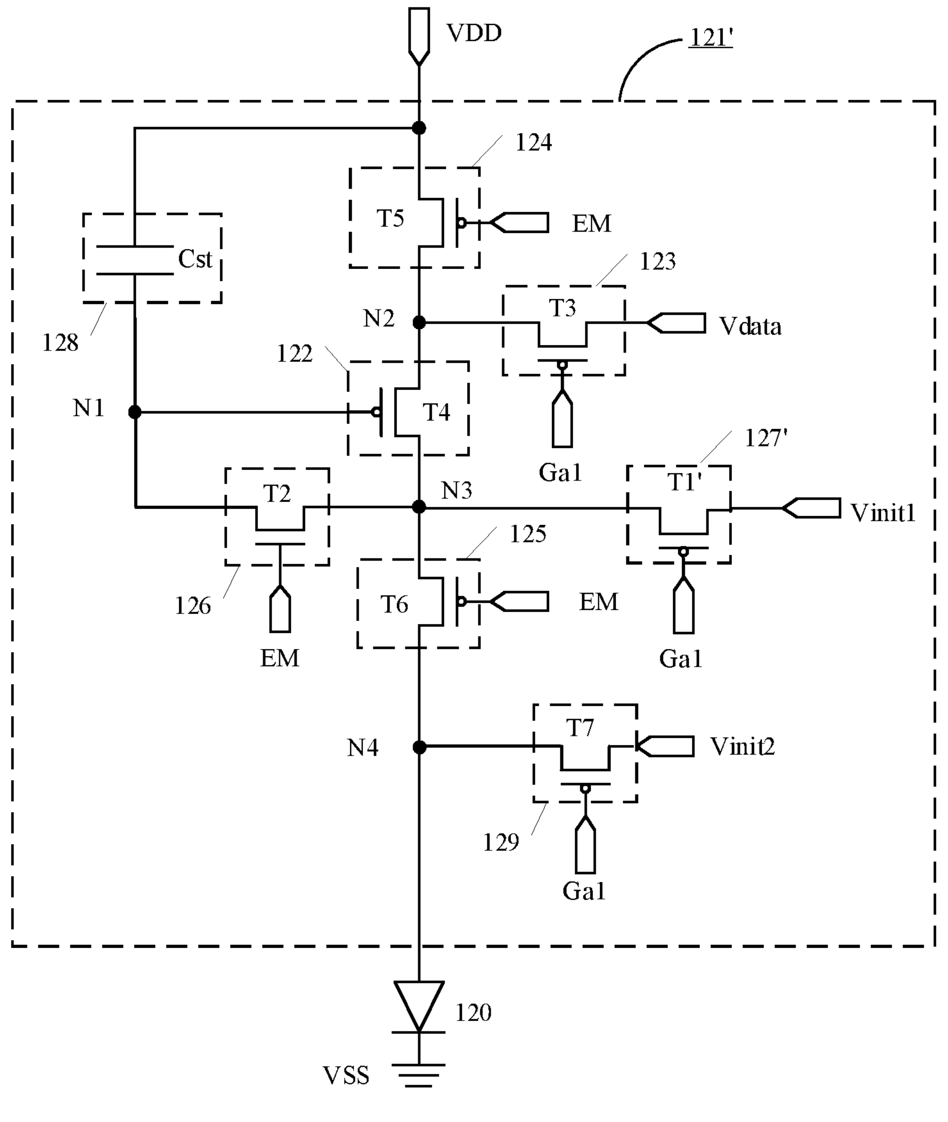
FIG. 5 is a schematic structural diagram of another pixel circuit provided by at least one embodiment of the present disclosure.

FIG. 5 is a schematic diagram of a pixel circuit provided by at least one embodiment of the present disclosure.

As shown in FIG. 5, the pixel circuit 121' includes a driving sub-circuit 122, a data writing sub-circuit 123, a first light-emitting control sub-circuit 124, a second light-emitting control sub-circuit 125, a compensation sub-circuit 126, a first reset sub-circuit 127', a storage sub-circuit 128, and a second reset sub-circuit 129. The pixel circuit 121' is configured to generate a driving current to control the light-emitting element 120 to emit light.

For example, the first reset sub-circuit of the pixel circuit includes the first transistor T1', the threshold compensation sub-circuit includes the second transistor T2, the storage sub-circuit 128 includes the first capacitor Cst, the data writing sub-circuit 123 includes the third transistor T3, the driving sub-circuit 122 includes the fourth transistor T4, the first light-emitting control sub-circuit 124 includes the fifth transistor T5, the second light-emitting control sub-circuit 125 includes the sixth transistor T6, and the second reset sub-circuit 129 includes the seventh transistor T7.

For example, the first transistor T1', the third transistor T3 to the seventh transistor T7 are LTPS thin film transistors, and the second transistor T2 is the LTPO thin film transistor.

The gate electrode of the first transistor T1 is electrically connected with the first scan signal terminal Ga1, the first electrode of the first transistor T1 is electrically connected with the second voltage terminal Vinit1, and the second electrode of the first transistor T1 is electrically connected with the second electrode of the fourth transistor T4; the gate electrode of the second transistor T2 is electrically connected with the light-emitting control signal terminal EM, the first electrode of the second transistor T2 is electrically connected with the gate electrode of the fourth transistor T4, and the second electrode of the second transistor T2 is electrically connected with the second electrode of the fourth transistor T4; the first end of the first capacitor Cst is electrically connected with the gate electrode of the fourth transistor T4, and the second end of the first capacitor Cst is electrically connected with the first voltage terminal VDD; the gate electrode of the third transistor T3 is electrically connected with the first scan signal terminal Ga1, the first electrode of the third transistor T3 is electrically connected with the data signal terminal Vdata, and the second electrode of the third transistor T3 is electrically connected with the first electrode of the fourth transistor T4; the gate electrode of the fifth transistor T5 is electrically connected with the light-emitting control signal terminal EM, the first electrode of the fifth transistor T5 is electrically connected with the first voltage terminal Vinit1, and the second electrode of the fifth transistor T5 is electrically connected with the first electrode of the fourth transistor T4; the gate electrode of the sixth transistor T6 is connected to the light-emitting signal control terminal EM, the first electrode of the sixth transistor T6 is electrically connected to the second electrode of the fourth transistor T4, and the second electrode of the sixth transistor T6 is electrically connected to the first electrode of the light-emitting element 120; the gate electrode of the seventh transistor T7 is electrically connected with the first scan signal terminal Ga1, the first electrode of the seventh transistor T7 is electrically connected with the third voltage terminal Vinit2, and the second electrode of the seventh transistor T7 is electrically connected with the second electrode of the sixth transistor T6.

Like the pixel circuit 121, only one leakage path exists at the control terminal of the driving sub-circuit 122 of the pixel circuit 121', which can optimize the Flicker problem of the display screen. In addition, because the second transistor T2 is not located on the leakage path at this time, the second transistor T2 may be set as an LTPS thin film transistor, and the LTPS thin film transistor has a small volume, which can reduce the layout space of the pixel circuit and improve the resolution of the display panel.

In addition, as mentioned above, the second transistor T2 is controlled by the signal from the light-emitting signal control terminal EM, which can increase the charging time and is more conducive to the display of the image in the high-frequency display mode.

In addition, the third transistor T3, the first transistor T1', and the seventh transistor T7 in the pixel circuit 121' are all controlled by the signal of the first scan signal terminal Ga1, so that a group of GOA signals may be reduced, which is beneficial to the narrow frame design of the display panel, reduces the wiring space of the pixel circuit, and further improves the resolution of the display panel.

For example, like the pixel circuit 121, the signal voltage of the second voltage terminal Vinit1 and the signal voltage of the third voltage terminal Vinit2 in the pixel circuit 121' may still be designed differently. For example, the voltage value of the signal of the third voltage terminal Vinit2 is greater than the voltage value of the signal of the second voltage terminal Vinit1, so as to increase the stability of the device and further ameliorate the flicker problem of the screen.

In addition, when the signal of the light-emitting control signal terminal EM is a PWM signal, the control terminal of the second transistor T2 needs to be electrically connected to the compensation control signal terminal Cps.

The driving method for the pixel circuit 121' may be set by referring to the corresponding description in combination with the circuit timing diagrams shown in FIG. 4A to FIG. 4D, which will not be repeated here.

For the present disclosure, the following statements should be noted:

(1) The accompanying drawings of the embodiment(s) of the present disclosure involve only the structure(s) related to the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should be understood that, in the case in which a component or element such as a layer, film, region, substrate or the like is referred to be "on" or "under" another component or element, the component or element may be "directly" "on" or "under" the another component or element or a component or element is interposed therebetween.

(3) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A pixel circuit, comprising a driving sub-circuit, a data writing sub-circuit, a first light-emitting control sub-circuit, a second light-emitting control sub-circuit, a compensation sub-circuit, and a first reset sub-circuit, and configured to generate a driving current to control a light-emitting element to emit light, wherein the driving sub-circuit comprises a control terminal, a first terminal, and a second terminal;

the data writing sub-circuit is electrically connected to the first terminal of the driving sub-circuit and a data signal terminal, and is configured to write a data signal of the data signal terminal into the first terminal of the driving sub-circuit in response to a signal of a first scan signal terminal;

the compensation sub-circuit is electrically connected to the second terminal of the driving sub-circuit and the control terminal of the driving sub-circuit, and is configured to perform threshold compensation on the driving sub-circuit in response to a signal of a compensation control signal terminal;

the first light-emitting control sub-circuit is electrically connected to the first terminal of the driving sub-circuit and a first voltage terminal, and is configured to achieve a connection between the driving sub-circuit and the first voltage terminal to be turned on or off in response to a signal of a light-emitting signal control terminal;

the second light-emitting control sub-circuit is electrically connected to the second terminal of the driving sub-circuit and a first electrode of the light-emitting element, and is configured to achieve a connection between the driving sub-circuit and the light-emitting element to be turned on or off in response to the signal of the light-emitting signal control terminal; and the first reset sub-circuit is electrically connected to the second terminal of the driving sub-circuit and a second voltage terminal, and is configured to write a signal of the second voltage terminal into the second terminal of the driving sub-circuit in response to a signal of a second scan signal terminal;

wherein the first reset sub-circuit comprises a first transistor, the compensation sub-circuit comprises a second transistor, the first transistor and the second transistor are both oxide transistors, and an active layer type of the second transistor is different from an active layer type of a transistor comprised in at least one selected from a group consisting of the driving sub-circuit, the data writing sub-circuit, the first light-emitting control sub-circuit, and the second light-emitting control sub-circuit;

wherein the signal of the light-emitting signal control terminal is a pulse width modulation signal, and the compensation control signal terminal and the light-emitting signal control terminal are connected to an identical signal line.

2. The pixel circuit according to claim 1, further comprising a second reset sub-circuit, wherein the second reset sub-circuit is electrically connected to the first electrode of the light-emitting element and a third voltage terminal, and is configured to write a signal of the third voltage terminal into the first electrode of the light-emitting element in response to a signal of a reset control signal terminal to reset the first electrode of the light-emitting element.

3. The pixel circuit according to claim 2, wherein the first scan signal terminal and the reset control signal terminal are connected to an identical signal line.

4. The pixel circuit according to claim 3, wherein the data writing sub-circuit comprises a third transistor, in a case where the pixel circuit is in a first display mode, a turn-on frequency of the third transistor is greater than a turn-on frequency of the second transistor, and in a case where the third transistor and the second transistor are both turned on, the data signal is transmitted to the control terminal of the driving sub-circuit.

5. The pixel circuit according to claim 2, wherein a voltage value of the signal of the third voltage terminal is greater than a voltage value of the signal of the second voltage terminal.

6. The pixel circuit according to claim 2, wherein the second reset sub-circuit comprises a seventh transistor, a gate electrode of the seventh transistor is electrically connected with the reset control signal terminal, a first electrode of the seventh transistor is electrically connected with the third voltage terminal, and a second electrode of the seventh transistor is electrically connected with the first electrode of the light-emitting element.

7. The pixel circuit according to claim 1, further comprising a storage sub-circuit, wherein the storage sub-circuit is electrically connected to the control terminal of the driving sub-circuit and the first voltage terminal, and is configured to store a compensation signal acquired based on the data signal.

8. The pixel circuit according to claim 7, wherein the storage sub-circuit comprises a first capacitor, the data writing sub-circuit comprises a third transistor, and the driving sub-circuit comprises a fourth transistor, the control terminal of the driving sub-circuit comprises a gate electrode of the fourth transistor, the first terminal of the driving sub-circuit comprises a first electrode of the fourth transistor, and the second terminal of the driving sub-circuit comprises a second electrode of the fourth transistor;

a gate electrode of the second transistor is electrically connected with the compensation control signal terminal, a second electrode of the second transistor is electrically connected with the second electrode of the fourth transistor, and a first electrode of the second transistor is electrically connected with the gate electrode of the fourth transistor;

a first end of the first capacitor is electrically connected with the gate electrode of the fourth transistor, and a second end of the first capacitor is electrically connected with the first voltage terminal;

a gate electrode of the third transistor is electrically connected with the first scan signal terminal, a first electrode of the third transistor is electrically connected with the data signal terminal, and a second electrode of the third transistor is electrically connected with the first electrode of the fourth transistor.

9. The pixel circuit according to claim 1, wherein the first light-emitting control sub-circuit comprises a fifth transistor, and the second light-emitting control sub-circuit comprises a sixth transistor;

a gate electrode of the fifth transistor is electrically connected with the light-emitting signal control terminal, a first electrode of the fifth transistor is connected with the first voltage terminal, and a second electrode of the fifth transistor is electrically connected with the first terminal of the driving sub-circuit;

a gate electrode of the sixth transistor is electrically connected with the light-emitting signal control terminal, a first electrode of the sixth transistor is electrically connected with the second terminal of the driving sub-circuit, and a second electrode of the sixth transistor is electrically connected with the first electrode of the light-emitting element.

10. The pixel circuit according to claim 1, wherein a gate electrode of the first transistor is electrically connected with the second scan signal terminal, a first electrode of the first transistor is electrically connected with the second terminal of the driving sub-circuit, and a second electrode of the first transistor is electrically connected with the second voltage terminal.

11. The pixel circuit according to claim 1, further comprising a storage sub-circuit and a second reset sub-circuit, wherein the storage sub-circuit comprises a first capacitor, the data writing sub-circuit comprises a third transistor, the driving sub-circuit comprises a fourth transistor, the first light-emitting control sub-circuit comprises a fifth transistor, the second light-emitting control sub-circuit comprises a sixth transistor, and the second reset sub-circuit comprises a seventh transistor;

a gate electrode of the first transistor is electrically connected with the second scan signal terminal, a first electrode of the first transistor is electrically connected with a second electrode of the fourth transistor, and a second electrode of the first transistor is electrically connected with the second voltage terminal;

a gate electrode of the second transistor is electrically connected with the compensation control signal terminal, a first electrode of the second transistor is electrically connected with a gate electrode of the fourth transistor, and a second electrode of the second transistor is electrically connected with the second electrode of the fourth transistor;

a first end of the first capacitor is electrically connected with the gate electrode of the fourth transistor, and a second end of the first capacitor is electrically connected with the first voltage terminal;

a gate electrode of the third transistor is electrically connected with the first scan signal terminal, a first electrode of the third transistor is electrically connected with the data signal terminal, and a second electrode of the third transistor is electrically connected with a first electrode of the fourth transistor;

a gate electrode of the fifth transistor is electrically connected with the light-emitting signal control terminal, a first electrode of the fifth transistor is connected with the first voltage terminal, and a second electrode of the fifth transistor is electrically connected with the first electrode of the fourth transistor;

a gate electrode of the sixth transistor is connected with the light-emitting signal control terminal, a first electrode of the sixth transistor is electrically connected with the second electrode of the fourth transistor, and a second electrode of the sixth transistor is electrically connected with the first electrode of the light-emitting element;

a gate electrode of the seventh transistor is electrically connected with the reset control signal terminal, a first electrode of the seventh transistor is electrically connected with a third voltage terminal, and a second electrode of the seventh transistor is electrically connected with the second electrode of the sixth transistor.

12. The pixel circuit according to claim 11, wherein the third transistor, the fourth transistor, the fifth transistor, the sixth transistor, and the seventh transistor are polysilicon thin film transistors.

13. A display device, comprising a plurality of sub-pixels arranged in an array, wherein each sub-pixel comprises a pixel circuit and a light-emitting element, the pixel circuit comprises a driving sub-circuit, a data writing sub-circuit, a first light-emitting control sub-circuit, a second light-emitting control sub-circuit, a compensation sub-circuit, and a first reset sub-circuit, and is configured to generate a driving current to control the light-emitting element to emit light, the driving sub-circuit comprises a control terminal, a first terminal, and a second terminal;

the data writing sub-circuit is electrically connected to the first terminal of the driving sub-circuit and a data signal terminal, and is configured to write a data signal of the data signal terminal into the first terminal of the driving sub-circuit in response to a signal of a first scan signal terminal;

the compensation sub-circuit is electrically connected to the second terminal of the driving sub-circuit and the control terminal of the driving sub-circuit, and is configured to perform threshold compensation on the driving sub-circuit in response to a signal of a compensation control signal terminal;

the first light-emitting control sub-circuit is electrically connected to the first terminal of the driving sub-circuit and a first voltage terminal, and is configured to achieve a connection between the driving sub-circuit and the first voltage terminal to be turned on or off in response to a signal of a light-emitting signal control terminal;

the second light-emitting control sub-circuit is electrically connected to the second terminal of the driving sub-circuit and a first electrode of the light-emitting element, and is configured to achieve a connection between the driving sub-circuit and the light-emitting element to be turned on or off in response to the signal of the light-emitting signal control terminal; and the first reset sub-circuit is electrically connected to the second terminal of the driving sub-circuit and a second voltage terminal, and is configured to write a signal of the second voltage terminal into the second terminal of the driving sub-circuit in response to a signal of a second scan signal terminal;

wherein the first reset sub-circuit comprises a first transistor, the compensation sub-circuit comprises a second transistor, the first transistor and the second transistor are both oxide transistors, and an active layer type of the second transistor is different from an active layer type of a transistor comprised in at least one selected from a group consisting of the driving sub-circuit, the data writing sub-circuit, the first light-emitting control sub-circuit, and the second light-emitting control sub-circuit;

wherein the signal of the light-emitting signal control terminal is a pulse width modulation signal, and the compensation control signal terminal and the light-emitting signal control terminal are connected to an identical signal line.

14. The display device according to claim 13, wherein second scan signal terminals of pixel circuits of sub-pixels located in an i-th row and compensation control signal terminals of pixel circuits of sub-pixels located in an (i-1)-th row are connected to an identical signal line, where i is a positive integer greater than 1 and i is less than or equal to a total number of rows of the plurality of sub-pixels.

15. A driving method for driving a pixel circuit, wherein the pixel circuit comprises a driving sub-circuit, a data writing sub-circuit, a first light-emitting control sub-circuit, a second light-emitting control sub-circuit, a compensation sub-circuit, and a first reset sub-circuit, and is configured to generate a driving current to control a light-emitting element to emit light, the driving sub-circuit comprises a control terminal, a first terminal, and a second terminal;

the data writing sub-circuit is electrically connected to the first terminal of the driving sub-circuit and a data signal terminal, and is configured to write a data signal of the data signal terminal into the first terminal of the driving sub-circuit in response to a signal of a first scan signal terminal;

the compensation sub-circuit is electrically connected to the second terminal of the driving sub-circuit and the control terminal of the driving sub-circuit, and is configured to perform threshold compensation on the driving sub-circuit in response to a signal of a compensation control signal terminal;

the first light-emitting control sub-circuit is electrically connected to the first terminal of the driving sub-circuit and a first voltage terminal, and is configured to achieve a connection between the driving sub-circuit and the first voltage terminal to be turned on or off in response to a signal of a light-emitting signal control terminal;

the second light-emitting control sub-circuit is electrically connected to the second terminal of the driving sub-circuit and a first electrode of the light-emitting element, and is configured to achieve a connection between the driving sub-circuit and the light-emitting element to be turned on or off in response to the signal of the light-emitting signal control terminal; and the first reset sub-circuit is electrically connected to the second terminal of the driving sub-circuit and a second voltage terminal, and is configured to write a signal of the second voltage terminal into the second terminal of the driving sub-circuit in response to a signal of a second scan signal terminal;

wherein the first reset sub-circuit comprises a first transistor, the compensation sub-circuit comprises a second transistor, the first transistor and the second transistor are both oxide transistors, and an active layer type of the second transistor is different from an active layer type of a transistor comprised in at least one selected from a group consisting of the driving sub-circuit, the data writing sub-circuit, the first light-emitting control sub-circuit, and the second light-emitting control sub-circuit, wherein a working process of the pixel circuit in one display frame comprises an initialization phase, a data writing phase, and a light-emitting phase, the driving method comprises:

in the initialization phase, controlling a level of the signal of the first scan signal terminal to be a first level, controlling a level of the signal of the second scan signal terminal to be the first level, controlling a level of the signal of the compensation control signal terminal to be the first level, and controlling a level of the signal of the light-emitting signal control terminal to be the first level;

in the data writing phase, controlling the level of the signal of the first scan signal terminal to be a second level, controlling the level of the signal of the second scan signal terminal to be the second level, controlling the level of the signal of the compensation control signal terminal to be the first level, and controlling the level of the signal of the light-emitting signal control terminal to be the first level;

in the light-emitting phase, controlling the level of the signal of the first scan signal terminal to be the first level, controlling the level of the signal of the second scan signal terminal to be the second level, controlling the level of the signal of the compensation control signal terminal to be the second level, controlling the level of the signal of the light-emitting signal control terminal to be the second level.

16. The driving method according to claim 15, wherein in a case where the pixel circuit comprises a second reset sub-circuit, the second reset sub-circuit is configured to write a signal of a third voltage terminal into the first electrode of the light-emitting element in response to a signal of a reset control signal terminal to reset the first electrode of the light-emitting element, the driving method further comprises:

controlling the signal of the first scan signal terminal to be identical with the signal of the reset control signal terminal.

17. The driving method according to claim 16, wherein in a case where the pixel circuit is in a first display mode, the working process of the pixel circuit in the one display frame further comprises a reset phase, the driving method further comprises:

in the reset phase, controlling the level of the signal of the light-emitting signal control terminal to be the first level, controlling the level of the signal of the first scan signal terminal to be the second level, controlling the level of the signal of the second scan signal terminal to be the second level, and controlling the level of the signal of the compensation control signal terminal to be the second level.

18. The driving method according to claim 15, wherein the working process of the pixel circuit in the one display frame further comprises a non-light-emitting phase, the driving method further comprises:

in the non-light-emitting phase, controlling the level of the signal of the light-emitting signal control terminal to be the first level, controlling the level of the signal of the first scan signal terminal to be the first level, controlling the level of the signal of the second scan signal terminal to be the second level, and controlling the level of the signal of the compensation control signal terminal to be the second level.

19. The driving method according to claim 15, wherein the signal of the light-emitting signal control terminal is a pulse width modulation signal.

* * * * *